United States Patent
Drew et al.

(10) Patent No.: US 12,536,920 B2
(45) Date of Patent: *Jan. 27, 2026

(54) TRANSFORMER TRAINING LAB

(71) Applicant: Quanta Associates, L.P., Houston, TX (US)

(72) Inventors: Alan Drew, Eagle, ID (US); Aaron Howell, Boise, ID (US); Mark Groves, Boise, ID (US); Aaron Marshall Jenkins, Boise, ID (US); Phil Carrillo, Boise, ID (US)

(73) Assignee: Quanta Associates, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/421,423

(22) Filed: Jan. 24, 2024

(65) Prior Publication Data

US 2024/0242624 A1 Jul. 18, 2024

Related U.S. Application Data

(63) Continuation of application No. 17/643,577, filed on Dec. 9, 2021, now Pat. No. 11,915,604, which is a continuation of application No. 16/148,863, filed on Oct. 1, 2018, now Pat. No. 11,227,508.

(51) Int. Cl.
*G09B 19/00* (2006.01)
(52) U.S. Cl.
CPC .............................. *G09B 19/0069* (2013.01)
(58) Field of Classification Search
CPC ............................................. G09B 19/0069
USPC ......................................................... 434/219
See application file for complete search history.

(56) References Cited

U.S. PATENT DOCUMENTS

| | | |
|---|---|---|
| 5,495,149 A | 2/1996 | Hiramatsu |
| 6,696,925 B1 | 2/2004 | Aiello, Jr. |

*Primary Examiner* — Kesha Frisby
(74) *Attorney, Agent, or Firm* — Knobbe Martens Olson & Bear LLP

(57) ABSTRACT

Disclosed herein are embodiments of a training lab that can be used as a teaching platform for individuals to learn electronic maintenance, such as transformer maintenance. The training lab can be either stationary or mobile, or can switch between the two modes. Modified transformers, or other equipment, can be incorporated into the lab to improve training.

16 Claims, 25 Drawing Sheets

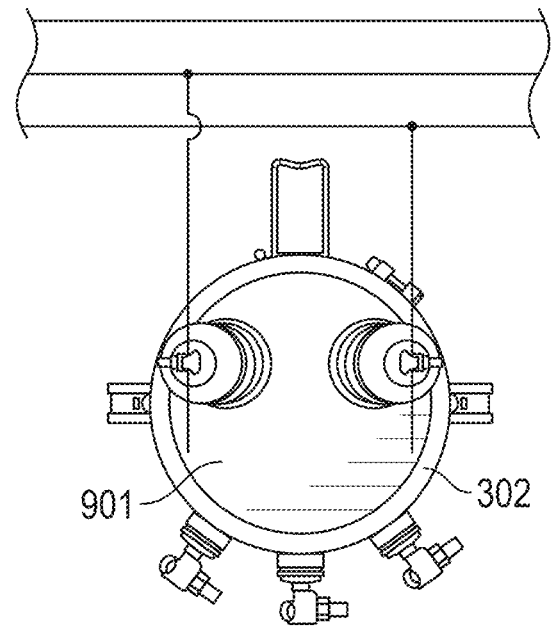
FIG. 9A
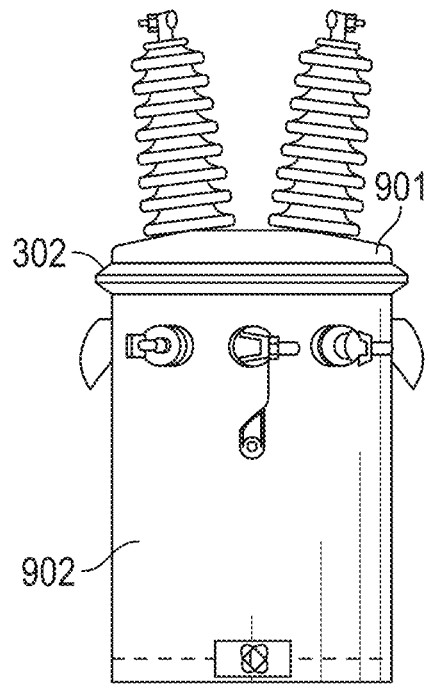 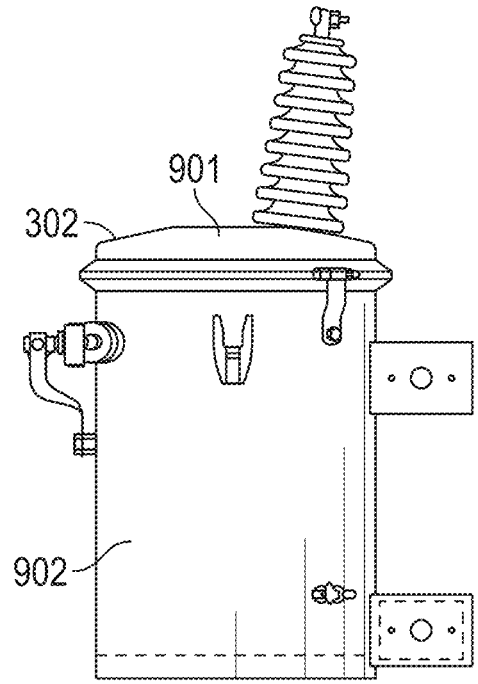
FIG. 9B        FIG. 9C

TRANSFORMER TRAINING LAB

INCORPORATION BY REFERENCE TO ANY PRIORITY APPLICATIONS

This application is a continuation of U.S. application Ser. No. 17/643,577, filed Dec. 9, 2021, which is a continuation of U.S. application Ser. No. 16/148,863, filed Oct. 1, 2018, and which is incorporated herein by reference. Any and all applications for which a foreign or domestic priority claim is identified in the Application Data Sheet as filed with the present application are hereby incorporated by reference under 37 CFR 1.57.

BACKGROUND

Field

The disclosure is generally related to training labs or modules for teaching individuals proper safety/maintenance/installation of electric equipment, such as high voltage equipment like transformers.

SUMMARY

Disclosed herein are embodiments of a mobile transformer training lab comprising an outer shell having a hollow interior, the outer shell having a front wall, a back wall, and two side walls connecting the front wall and the back wall, a back access location in the back wall to provide access into the hollow interior, a plurality of side access locations in at least one of the two side walls to provide access into the hollow interior, a load bay located in at least one of the plurality of side access locations, the load bay containing training electrical equipment, and a generator, wherein the hollow interior contains at least two poles, at least one transformer, at least one insulator, and at least one wire configured to extend between the two poles, and wherein the generator is configured to provide electrical energy to the at least one transformer.

In some embodiments, each of the plurality of side access locations can contain a load bay. In some embodiments, the lab can comprise a plurality of wheels.

In some embodiments, the at least one transformer can comprise a hinged lid for accessing inside a housing of the at least one transformer. In some embodiments, the at least one transformer can further comprise a continuity transformer including at least one switch to create open points, shorts, or other common transformer issues. In some embodiments, the load bay can include a residential home equipment representative of a residential home, wherein the residential home equipment includes an outer housing, a removable front panel with at least one window, at least one light bulb and socket, and an actuator for energizing the residential home equipment with one phase. In some embodiments, the load bay can include a representation of a three phase motor component comprising a wired three phase motor configured to spin a blade with arrows indicating rotation of the blade. In some embodiments, the load bay can include an emergency stop.

In some embodiments, the at least two poles can include support legs configured to be bolted into a surface. In some embodiments, the back access location can include a ramp configured to extend from the mobile transformer training lab. In some embodiments, the load bay can be formed from a plurality of metal tubes at least partially covered by a dielectric sheathing.

Also disclosed herein are embodiments of a modular stationary training lab comprising at least one working station comprising at least two poles, at least one transformer, at least one insulator, at least one wire configured to extend between the at least two poles, and a movable load cart, wherein the movable load cart contains electronic training equipment for the installation and maintenance of the at least one transformer, wherein the modular stationary training lab is configured to scale by including multiple numbers of the at least one working station.

In some embodiments, the modular stationary training lab can further comprise an energy source. In some embodiments, the modular stationary training lab can comprise a plurality of the at least one working station.

In some embodiments, the electrical training equipment can comprise a three phase meter and a single phase meter. In some embodiments, the electrical training equipment can comprise a residential home equipment representative of a residential home, wherein the residential home equipment includes an outer housing, a removable front panel with at least one window, at least one light bulb and socket, and an actuator for energizing the residential home equipment with one phase, and a representation of a three phase motor component comprising a wired three phase motor configured to spin a blade with arrows indicating rotation of the blade.

Further disclosed are embodiments of a modified transformer comprising a generally cylindrical body having a hollow interior, an extension extending away from the generally cylindrical body, a hinge arm having a first end and a second end, the first end rotatably attached to the extension, a transformer lid attached to the second end of the hinge arm, a lock configured to hold the transformer lid onto the generally cylindrical body, and at least one insulator attached on an outer surface of the transformer lid, wherein the transformer lid is configured to rotatably translate between an open position and a closed position, wherein the hollow interior of the generally cylindrical body is accessible in the open position, and wherein the lock is configured to hold the transformer lid in the closed position.

In some embodiments, the extension can be located on a top half of the generally cylindrical body. In some embodiments, the lock can comprise a thumb screw. In some embodiments, the transformer can further include a sealing ring located at least partially surrounding a portion of the generally cylindrical body, wherein the sealing ring is located between an outer surface of the generally cylindrical body and an inner surface of the transformer lid in the closed position.

BRIEF DESCRIPTION OF THE DRAWINGS

FIGS. 9A-9C illustrate an embodiment of a transformer which can be used with the training labs disclosed herein.

DETAILED DESCRIPTION

Figure 1:
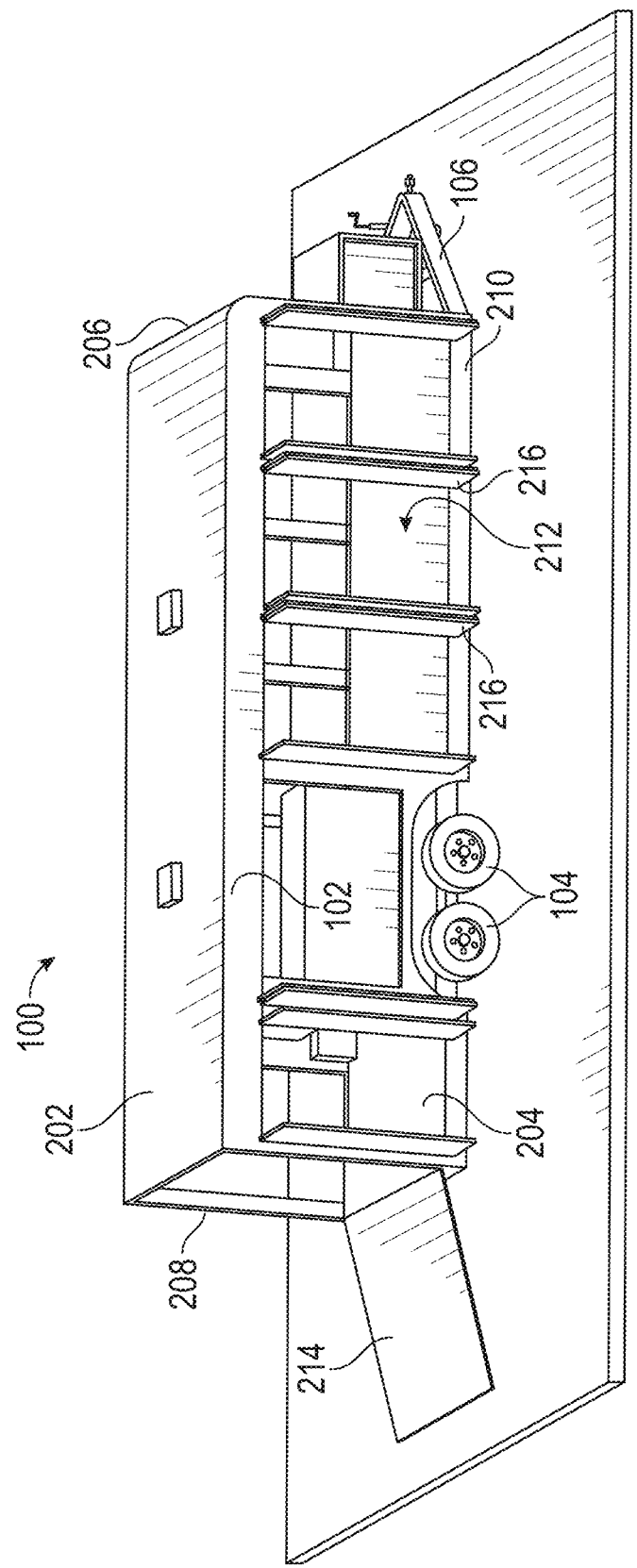
FIG. 1 illustrates an embodiment of a mobile training lab.
Figure 2A:
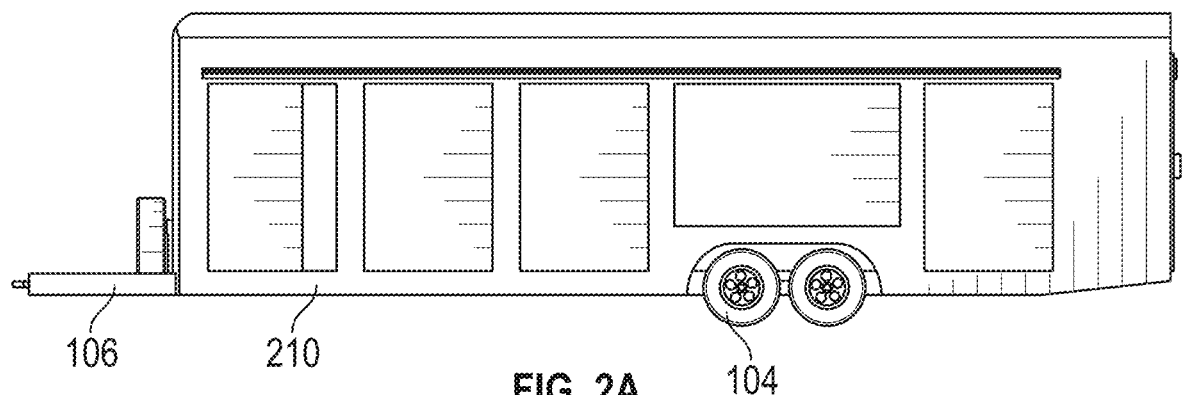
FIGS. 2A-2D illustrate a schematic of an embodiment of a mobile training lab.
Figure 2B:
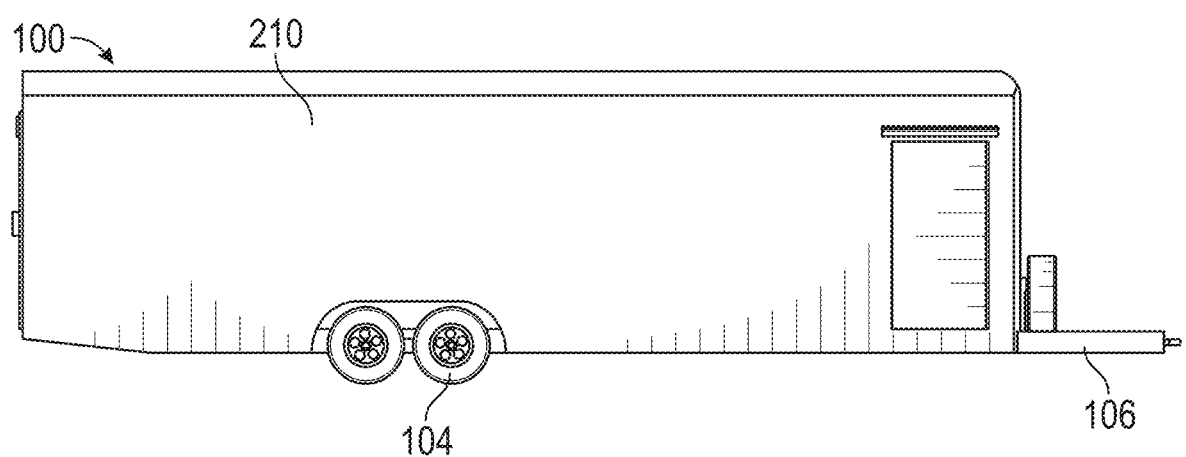
Figure 2C:
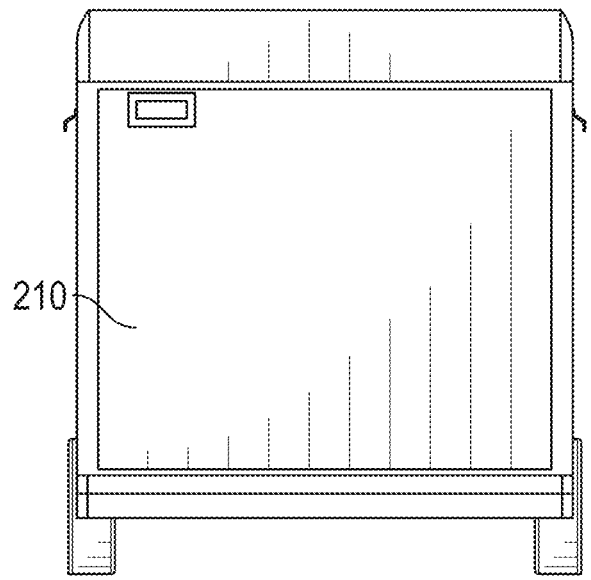
Figure 2D:
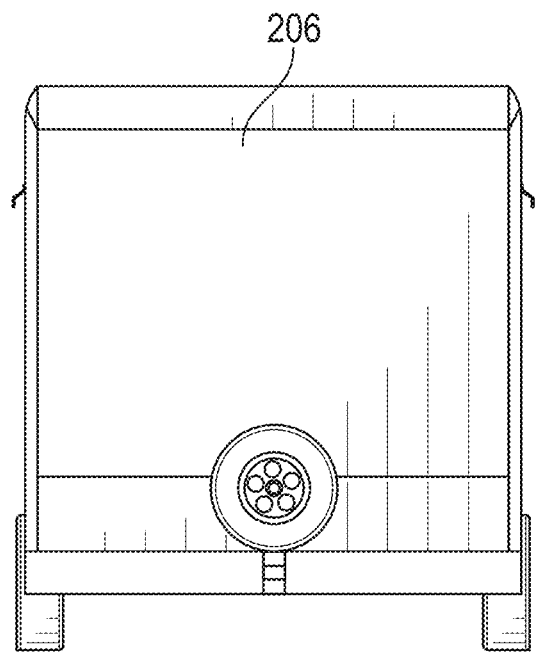

Disclosed herein are embodiments of a training labs (e.g., training units or training modules). The training lab can be used for electronic and/or high voltage training for individuals, such as lineworkers. For example, embodiments of the training lab can be used to teach individuals proper installation and/or maintenance for transformers.

Understanding how to properly install and connect transformers is an important skill for all lineworkers. There has not been a solution that can be used to effectively teach lineman transformer connections until the below disclosure. Further, not only can lineman benefit from embodiments of the disclosed training labs, but also meter readers, meter technicians, electrical engineers, and any electrical utility or electrical contractor employees who need to recognize electrical utility components and how they operate for basic comprehensions of the industry, as well as when responding to large outages and storms when all employees are utilized to recognize and report electrical problems.

Embodiments of the disclosure can provide advantages in a number of different areas. For example, a first improvement is in the field of safety. While electricity is inherently dangerous, embodiments of the disclosure can be made as safe as possible. To that end, the primary voltage can be 120 v and the transformers are a 1-1 ratio so the secondary voltage is a common voltage that will utilized for many residential and commercial customers. The fusing can also be kept as low as possible while still able to power a three phase motor and a residential lighting load. For example, motor current limiting fuses of 3 amp more than the primary switched cutout fuses, which are at 1 amp, can be used. This design can allow for ease of seeing/finding primary fuses that blow out. Additionally, current limiting fuses are utilized to reduce any significant arc flash hazard. For example, 30 amp fuses could be used all the way up to 5000 amp fuses. The fuses maximum can depend upon the fault current available at a particular power source. In implementations of the disclosed training labs, kill switches can be located inside each load bay, discussed below, to allow quick disconnect of the electrical system if there were a need. Also embodiments of the disclosed lab can include safety features such as audible horn or flashing light prior to energizing the lab to warn users that the lab is going to be energized. Another safety design was to incorporate lights to show which parts are energized.

A second advantage is related to Prosser's Theorem. Embodiments of the disclosed training lab can recreate the same transformer banking connections that are installed and utilized by utilities for their electrical customers, and to also make the training system operate just like it would in the real world. Whether the transformer connection was done correctly or incorrectly the result would be a near exact simulation of the events in the field. The unit is designed to provide training on supplying service to customers with the correct voltage and phase rotation. It also includes the ability to train on selecting and installing the proper revenue meter.

The third advantage was to make is a simple intuitive design. For example, the stationary models disclosed below are easy to construct and permanently install, and the mobile labs disclosed below utilize a tool-less installation process that easily sets up and disassembles and racks the components quickly to allow remote temporary training sessions. Thus, in some embodiments no tools are required to install the mobile lab equipment.

Generally, transformers are static electrical devices that transfer electrical energy between two or more circuits through electromagnetic induction. Transformers are important for the transmission, distribution, and utilization of electric energy. There is a wide and varied range and type of transformer designs, and embodiments of the disclosure can be used to train on any type of transformer. For example, a 0.15 kva 1-1 ratio transformer can be used with the below disclosure. The transformer can further be configured using other ratios for desired secondary voltage.

Training Lab

Advantageously, the training lab can be either be a mobile training lab or a stationary training lab, each of which is disclosed below. In some embodiments, the training lab can switch between mobile or stationary modes.

In some embodiments, the training lab can be operated by a generator or shore power, though other sources of electricity can be used as well. For example, a 3-phase 120-280 Vac power source can be used. The particular generator does not limit the disclosure.

Embodiments of the disclosed training lab is capable of training for all of the standard banks utilized in the field, from open banks to closed banks. Non-limiting examples include 1) Open Wye/Open Delta, 2) Open Delta/Open Delta, 3) Closed WYE/WYE, 4) Closed WYE/Delta, 5) Closed Delta/Delta, or 6) Closed Delta/Wye. These are generally common banks, but the disclosure is not so limited. For example, uncommon builds can be utilized with the training lab as well. A few examples of uncommon builds that can be used with embodiments of the disclosure are a corner grounded closed Wye or Delta bank, a Scott bank or Hybrid Wye as well as changing the angular displacement in order to parallel banks. Advantageously, the training lab can be used for experimentation and creation/training on different types of banks. In addition, parallel transformers, recreating trouble shooting scenarios, and/or transformer banks can be used.

In some embodiments, energized work can be performed in the training lab. For example, this energizing can be used to check voltage, rotation, and power factor, though other checks can be used as well. In some embodiments, the lab may only be energized briefly, for example, 1 second, 10 seconds, 20 seconds, 30 seconds, 1 minute, 2 minutes, 3 minutes, 4 minutes, or 5 minutes. In some embodiments, the lab may be energized for greater than 1 second, 10 seconds, 20 seconds, 30 seconds, 1 minute, 2 minutes, 3 minutes, 4 minutes, or 5 minutes. In some embodiments, the lab may be energized for less than 10 seconds, 20 seconds, 30 seconds, 1 minute, 2 minutes, 3 minutes, 4 minutes, or 5 minutes. In other embodiments, the lab can be energized and worked on for extended time periods In some embodiments, the lab may be energized for 30 minutes, 1 hour, 2 hours, 5 hours, 10 hours, 12 hours, 24 hours, or multiple days. In some embodiments, the lab may be energized for greater than 30 minutes, 1 hour, 2 hours, 5 hours, 10 hours, 12 hours, 24 hours, or multiple days. In some embodiments, the lab may be energized for less than 30 minutes, 1 hour, 2 hours, 5 hours, 10 hours, 12 hours, 24 hours, or multiple days. The training lab can further include transformer connection miss wiring protection. For example, if the connection creates a short, a 1 amp fuse in a disconnect can melt-out and open when the transformer is energized.

Advantageously, the working areas disclosed below for the training labs can be modified, scaled, or adjusted based on the particular needs of the training individuals. Further, all necessary equipment for the training can be included in the training labs.

Mobile Lab

In some embodiments, the training lab can be mobile (e.g., mobile lab). An example of such a training lab 100 is shown in FIG. 1, with all internal electrical equipment removed for convenience. Further, FIGS. 2A-2D illustrates a schematic of an embodiment of the mobile training lab.

As shown in FIGS. 1-2, the mobile lab 100 can have a top wall 202, bottom wall 204, front wall 206, back wall 208, and two side walls 210. All of the walls can form a hollow or generally hollow interior 212, for example forming a shell. The walls can include windows, vents, grates, apertures, etc. as desired. The hollow interior 212 can include shelving, racks, hooks, attachment mechanisms, seating, seatbelts, drawers, or cabinets, and the particular equipment included in the hollow interior 212 is not limiting.

As shown, the mobile lab 100 can be shaped generally like a rectangular prism, such as a vehicle trailer. However, the particular shape of the mobile lab 100 is not limiting and other shapes/designs can be used as well. In some embodiments, the mobile lab 100 can have a body 102 and wheels 104, for example 2, 3, 4, 5, 6, 7, 8, 9, or 10 wheels. In some embodiments, the mobile lab 100 can have a spare wheel attached to an exterior.

The mobile lab 100 can include a hitch 106, or other attachment component, for attaching to another vehicle, such as a truck, SUV, tractor, etc. In some embodiments, the hitch 106 can extend forwards from the front wall 206. For example, the mobile lab 100 may be a bumper pull or a goose neck. In some embodiments, the mobile lab 100 can include its own engine (gas, diesel, or electric powered) so that the mobile lab 100 can be moved/transported without the use of an additional vehicle. The mobile lab 100 can include all necessary components for driving on public roads, such as turn signals, breaks, mirrors, etc. and can be customized to include some or all of these features.

The mobile lab 100 can be approximately 35 feet from center of the hitch 106 to the back wall 208. Further, the mobile lab 100 can be approximately 30.5 feet from the front wall 206 to the back wall 208. In some embodiments, the mobile lab 100 can have a weight capacity of greater than 10000, 11000, 12000, 13000, 14000, 15000, 16000, 17000, 1800, 19000, or 20000 pounds. In some embodiments, the mobile lab 100 can have a weight capacity of less than 12000, 13000, 14000, 15000, 16000, 17000, 1800, 19000, or 20000 pounds.

In some embodiments, the mobile lab 100 itself can be approximately 8, 9, 10, 11, 12, 13, 14, 15, 16, 17, 18, 19, or 20 feet in height. In some embodiments, the lab 100 can be in between any of the previously described foot heights, such as being 1, 2, 3, 4, 5, 6, 7, 8, 9, 10, or 11 inches (e.g., 10 foot 1 inch, 10 foot 2 inch, 10 foot 3 inch, 10 foot 4 inch, 10 foot 5 inch, 10 foot 6 inch, 10 foot 7 inch, 10 foot 8 inch, 10 foot 9 inch, 10 foot 10 inch, or 10 foot 11 inch).

All of the above are merely example dimensions of the mobile lab 100, and other shapes/dimensions can be used as well.

The back wall 208 can include one or more access location (e.g., apertures, holes, doorways, access points) which may be covered by doors (e.g., 1, 2, 3, 4). The access locations can be shaped and designed for individuals to enter and exit the mobile lab 100. The doors 216 can be configured to open outwards to provide access into the hollow interior. Further, a ramp 214 may extend from the back wall 208 to provide easier individual access into the mobile lab 100. In some embodiments, the ramp 214 may form a portion of the back wall, and can be folded down to provide access to the interior 212. When the ramp 214 is folded up, it may be attached, such as locked, to the mobile lab 100 to prevent access into the interior 212 from the back wall 208. The access location in the back wall 208 may be 2, 3, 4, 5, or 6 feet wide by 4, 5, 6, 7, 8, 9, or 10 feet tall. In some embodiments, the access location in the back wall 208 may be greater than 2, 3, 4, 5, or 6 feet wide by greater than 4, 5, 6, 7, 8, 9, or 10 feet tall. In some embodiments, the access location in the back wall 208 may be less than 2, 3, 4, 5, or 6 feet wide by less than 4, 5, 6, 7, 8, 9, or 10 feet tall.

Additionally, at least one of the side walls 210 can include a number of access locations as well. The access locations can be shaped and designed for individuals to enter and exit the mobile lab 100. For example, the side wall 210 can include 1, 2, 3, 4, 5, 6, 7 or 8 access locations, all of which may be covered by doors 216. One or two doors can be used per access location. The doors 216 can open outward, upward, and or be retractable. In addition, ramps may be used by one, some, or all of the access locations on the side wall 210. In some embodiments, both side walls 210 include access locations. In other embodiments, only one side wall 210 includes access locations. The access locations in the side wall 210 may all be generally the same size, or may vary. In some embodiments, access locations on both side walls 210 may be the same, or may be different for each side wall 210. The access location in the side walls 210 may be 2, 3, 4, 5, or 6 feet wide by 4, 5, 6, 7, 8, 9, or 10 feet tall. In some embodiments, the access location in the side walls 210 may be greater than 2, 3, 4, 5, or 6 feet wide by greater than 4, 5, 6, 7, 8, 9, or 10 feet tall. In some embodiments, the access location in the side walls 210 may be less than 2, 3, 4, 5, or 6 feet wide by less than 4, 5, 6, 7, 8, 9, or 10 feet tall.

Figure 3:
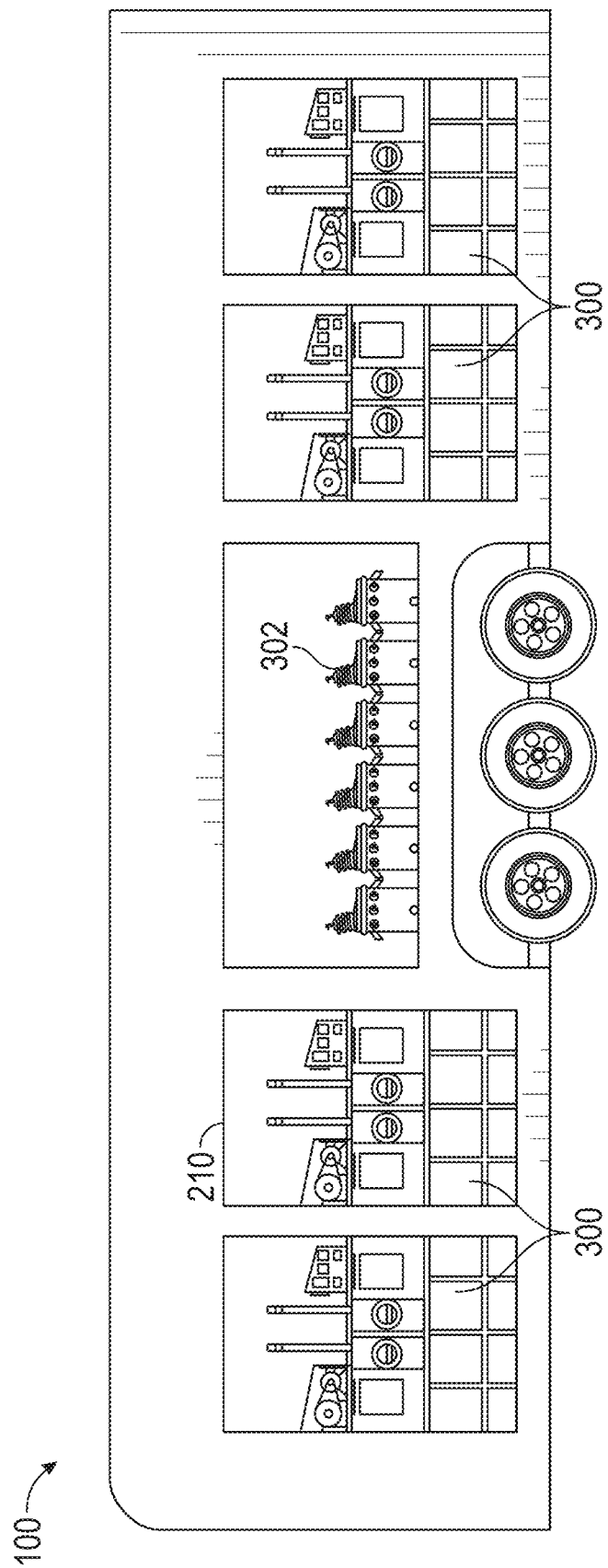
FIG. 3 illustrates a side view of an embodiment of a mobile training lab including load bay equipment.

The access locations may be designed as desired by a user. For example, as shown in FIGS. 2A-2D, the side wall 210 can include three access locations generally in front of the wheels 104 and one access location behind the wheels 104. However, this design is not limiting and can be modified. For example, there can be two access locations in front of the wheels 104 and two access locations behind the wheels 104, such as shown in FIG. 3. The location of the wheels 104 may change the particular access locations, and the location of the wheels does not limit the disclosure. In some embodiments, an access location may be located above the wheels 104. This access location may be wider than the other access locations of the side walls 210, but may have a smaller height. This can be used, for example, for storage of equipment.

In some embodiments, the mobile lab 100 can include legs extending downwards from the bottom wall 204 in an extended position. These legs may be adjustable in height and may end in a foot, providing for further stability to the mobile lab 100. The legs may fold up to the underside of the mobile lab 100 in a retracted position, such as against the bottom wall 204. In some embodiments, the legs may be retractable and/or telescopic. The legs may be locked in their extended and/or retracted positions.

Further, lights can be used on an exterior and/or interior surface of the mobile lab 100 to provide illumination for individuals who may be operating in nighttime. For example, lights may be located on one or both of the side walls 210, the back wall 208, the top wall 202, and/or the front wall 206. Warning lights and/or auditory warnings can be incorporated on the exterior of the mobile lab 100 as well.

Moving into the interior 212 of the mobile lab 100, the mobile lab 100 can be configured and customizable for containing a number of different pieces of equipment such as shown in FIG. 3. For example, the interior 212 may be configured to hold:

- Primary buss. The buss can be energized 120/208 vac 3 phase and may include wires, such as 4 wires.
- Composite crossarms. The crossarms may include energized system indicators such as lights/auditory warnings.
- Fused disconnects. The disconnects may include energized and phasing indicators.
- Poles, such as durable aluminum poles. The particular material is not limiting, and steel, aluminum, or alloys can be used.
- Single phase and three phase transformer installations. Transformers can be designed with a 120 v or 208 v primary rating and a 120/240 v secondary rating, but the particular ratings are not limiting. Advantageously, an individual can connect nearly every bank possible; Wye or delta, primary and secondary. This can include single phase transformer installations, single phase paralleling installations, three phase open banks, three phase closed banks, three phase paralleling installations, and rotation and phase sequencing.
- Dry erase surfaces. These can be configured to allow trainees to draw connection diagrams, rotation schematics and more.
- Three phase meter with meterbase, gang switch and three phase "sawmill" customer, discussed in detail below.
- Single phase meter with meterbase, load panel and 1-phase "residential home" customer, discussed in detail below.
- "Emergency Stop" power off safety switch.
- Hotstick storage which allows fiberglass live line tools to be held in a secure position while not being used.

However, the above equipment is not limiting, and other equipment can be incorporated into the mobile lab 100 as desired for training purposes, such as manuals, gloves, other electronic equipment, other setups that don't include poles, or other protective equipment. The mobile lab 100 can include all necessary equipment self-contained. In some embodiments, the mobile lab mobile lab can include a power source, such as a 3 phase generator, though the particular power source is not limiting. In some embodiments, an external power source can be used.

Each of the side wall 210 access locations in the mobile lab 100 can lead to a load bay (e.g., working bay) 300 contained in the interior 212, such as shown in FIG. 3. In some embodiments, each load bay 300 can include identical equipment. In other embodiments, each load bay 300 can include different equipment. In some embodiments, the load bays 300 can be moved so that they can extend partially out of the mobile lab 100 for ease of use. In some embodiments, the load bays 300 are permanently fixed. In some embodiments, each access location can have a load bay 300. In some embodiments, not all access locations can have a load bay 300. The mobile lab 100 can include 1, 2, 3, 4, 5, 6, 7, 8, 9, or 10 load bays 300. In some embodiments, the mobile lab 100 can include greater than 1, 2, 3, 4, 5, 6, 7, 8, 9, or 10 load bays 300. In some embodiments, the mobile lab 100 can include less than 2, 3, 4, 5, 6, 7, 8, 9, or 10 load bays 300.

The load bays 300 can support meter bases, switches, load panels, kill switches, residential two circuit house with backfeed component, commercial three phase motor with rotation arrows weather heads, service wire attachments drawer(s) for tools and misc., and dry erase boards. Each of the load bays 300 can have a metal tube construction with a dielectric composite sheathing, or can be formed of electrically insulating material, where the type of material is not limited. The dielectric sheathing can further insulate users from the electrical energy, enhancing safety and reducing/eliminating another difference in potential or second point of contact. In some embodiments, solar generation and/or wind generation components can be incorporated into the load bay 300, or the lab 100 itself.

In some embodiments, each load bay 300 can contain some or all of the following equipment:
- 3 phase meter base
- Single phase meter base
- Load panel for single phase house
- 3 phase gang switch
- 3 phase Sawmill (discussed below)
- Single phase #2 circuit house with Backfeed momentary switch and plug (discussed below)
- Kill switch
- Dry erase boards
- Live-line tool holders
- Drawer(s) for tools, connectors, fuses, curriculum, personal protective equipment, misc.
- Service wire trays In some embodiments, there are kill switches in each load bay 300. In some embodiments, a single kill switch in the mobile lab 100 can stop all electric flow. Further, control panels in the mobile lab 100 are designed to give an audible horn before energizing the line and there is a visual countdown on the control panel touch screen. Each load bay 300 can be operated individually to receive electric energy, or some or all load bays 300 can be collectively connected.

The transformers 302 themselves, or other equipment for training, can be located in the load bays 300, or in a different location such as shown in FIG. 3. The particular location of the equipment is not limiting to the disclosure.

Figure 4A:
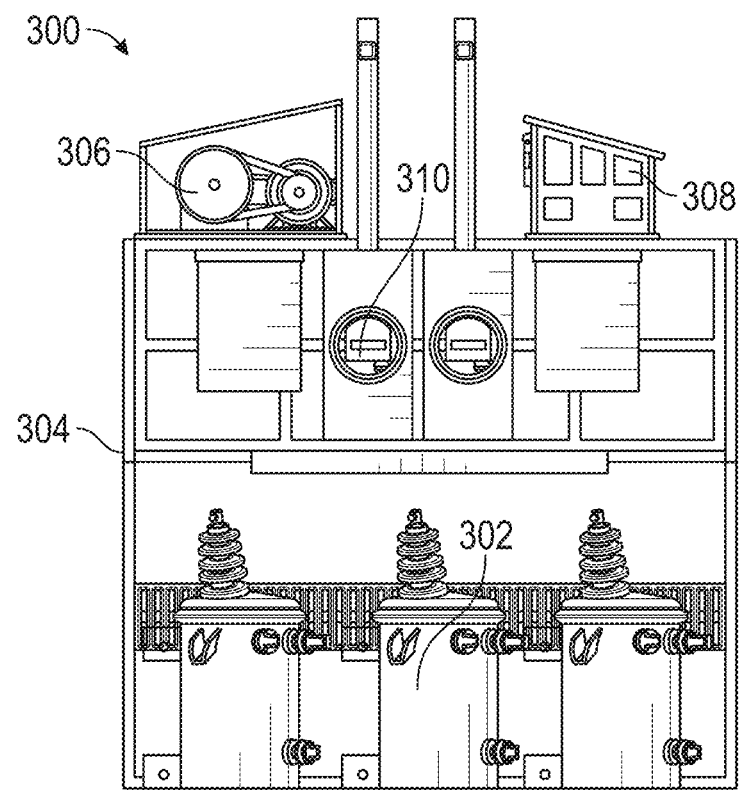
FIGS. 4A-4C illustrate embodiments of load bay equipment.
Figure 4B:
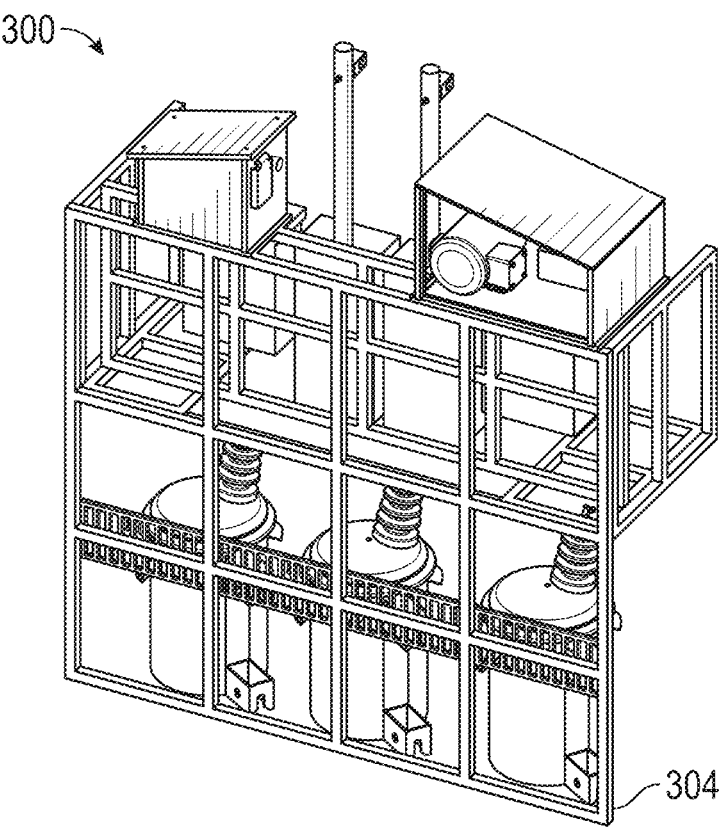
Figure 4C:
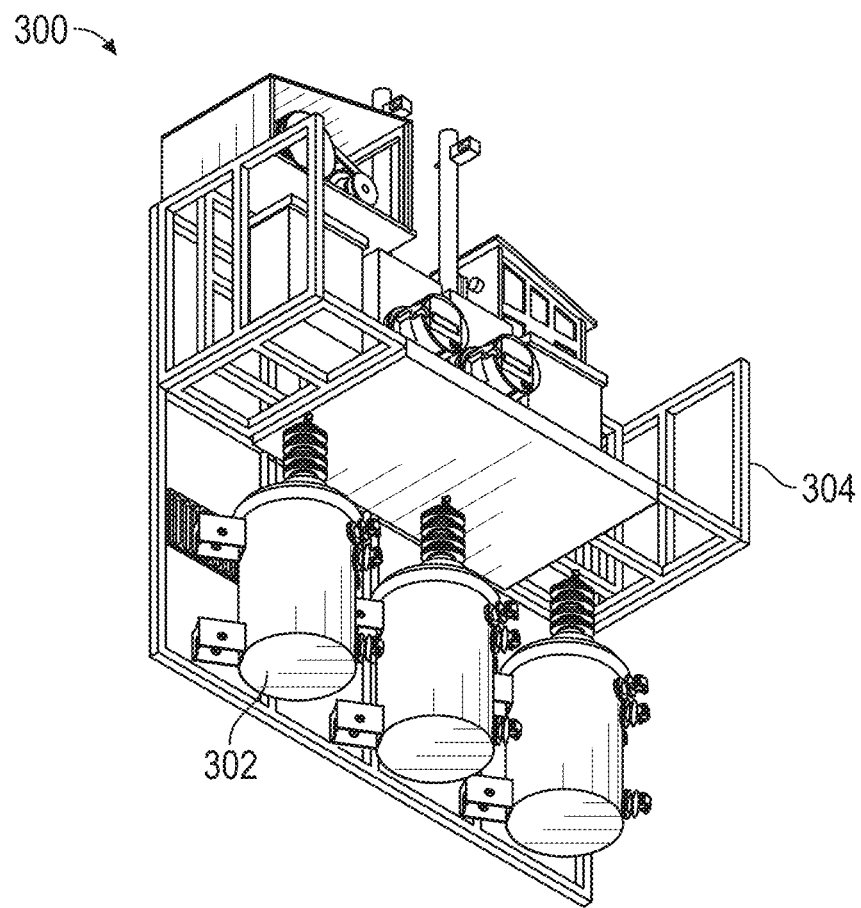

FIGS. 4A-4C illustrates the load bays 300 isolated, as well as the equipment and racking system (e.g., shelving, framing, holders) 304 that can be load in the load bays 300. In some embodiments, the racking system 304 can be attached on an internal surface of the mobile lab 100. In some embodiments, the racking system 304 can be removable in order for an individual to take all of the components out. Example equipment that can be found in the load bays are the transformers 302, the sawmill 306, the residential home 308, and sensors 310, and a kill switch.

As shown in FIGS. 4A-4C, the load bay 300 can have be formed from a series of connected frame pieces or metal tube 301, though other designs can be used as well. The frame pieces can be cylindrical or rectangular, and can have a diameter of about 1, 2, 3, 4, or 5 inches. As shown, the load bay 300 can have a front frame 303 forming a front wall. The front frame 303 can be approximately 5.5 feet tall and 4.5 feet wide, though the particular dimensions are not limiting. In some embodiments, a shelf 305 can extend rearward from the front frame 303, such as 1 and ⅔ feet rearward, which allows equipment to be located on the shelf. The shelf 305 can extend the width of the front frame 303. It can extend at approximately halfway the height of the front frame 303, or ⅓ of the height of the front frame 303 from the top. For example, the bottom of the shelf 305 can be approximately 21 inches from the top of the front frame. The shelf 305 can further include side wall frames 307 which may or may not be connected to the front frame 303. In some embodiments, the shelf 305 may be formed of two frame elements 309 on each side and a gap 311 between the frame elements where a solid shelving unit can be attached.

Further attachment mechanisms, clips, etc. can be incorporated into the racking system 304, along with any necessary strengthening features. The racking system 304 can be modified as desired for the specific equipment, and the particular design of the load bay is not limiting.

Figure 5:
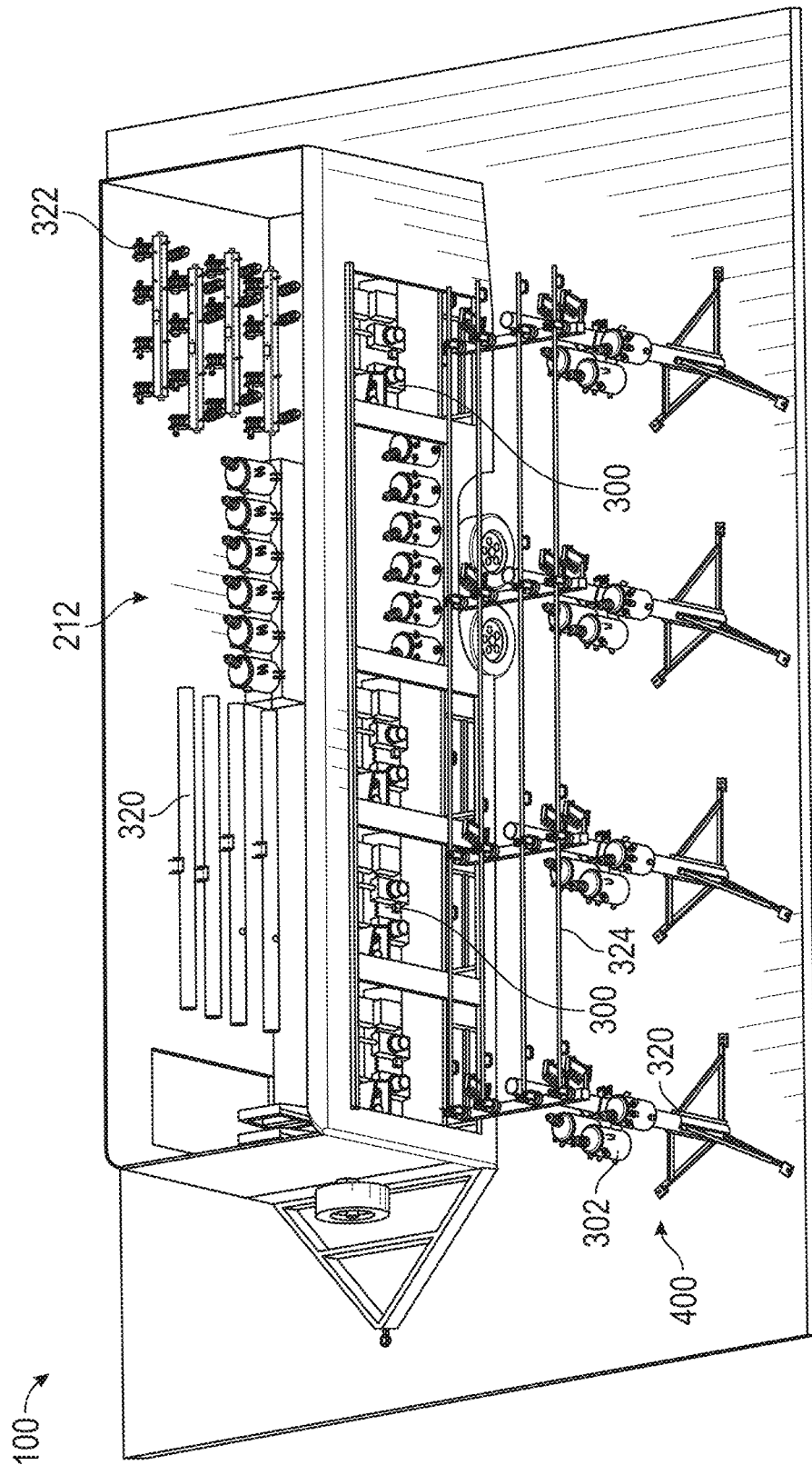
FIGS. 5-6 illustrate embodiments of a mobile training lab with transformer setup.

FIG. 5 illustrates an embodiment of a mobile lab 100 with the top wall 202 removed for convenience of viewing. As shown, the mobile lab 100 can include a number of load bays 300 for use by individuals in the training. Further, the mobile lab 100 can include a hollow interior 212, which can be configured to hold different components for training. Examples of such components are wires, transformers 302, poles 320, insulators 322, ladders, electrical equipment, capacitor banks, etc. Further, the interior 212 of the mobile lab 100 can include operational components, such as switches, sensors actuators, etc. to turn on and off electricity, monitor training activity, etc. In some embodiments, the mobile lab 100 can include a large control panel, such as on the back of the lab 100, with phase metering, power quality meter(s), power control(s), kill switch(es), and/or illuminated lights that represent phase statuses. In some embodiments, these features are each found in the equipment for the load bays 300. The interior of the mobile lab 100 can further contain one or more generators for operation of the electrical energy training. For example, the generators can be located over axles in the racking system 304 of the load bays 300. Thus, each load bay 300 can have its own generator. In some embodiments, a single generator can be used to power all load bays 300.

FIG. 5 further shows a working (or operating) area 400 set up outside of the mobile lab 100. The working area 400 can be approximately 15 foot wide by 25 foot long by 12 foot height, though this is merely an example configuration and the dimensions can vary depending on the equipment used and the space available. As shown, poles 320, transformers 302, wiring 324, etc. can be installed outside of each load bay 300 for training. In some embodiments, each pole 320 can be set up directly outside each load bay 300 for a 1:1 ratio. However, other ratios can be used as well, and the setup can be modified, such as based on the number of trainees. Thus, individuals can enter the mobile lab 100 to collect all necessary equipment to set up for training purposes. Accordingly, everything needed for training can be wholly contained within the mobile training lab 100.

Figure 6:
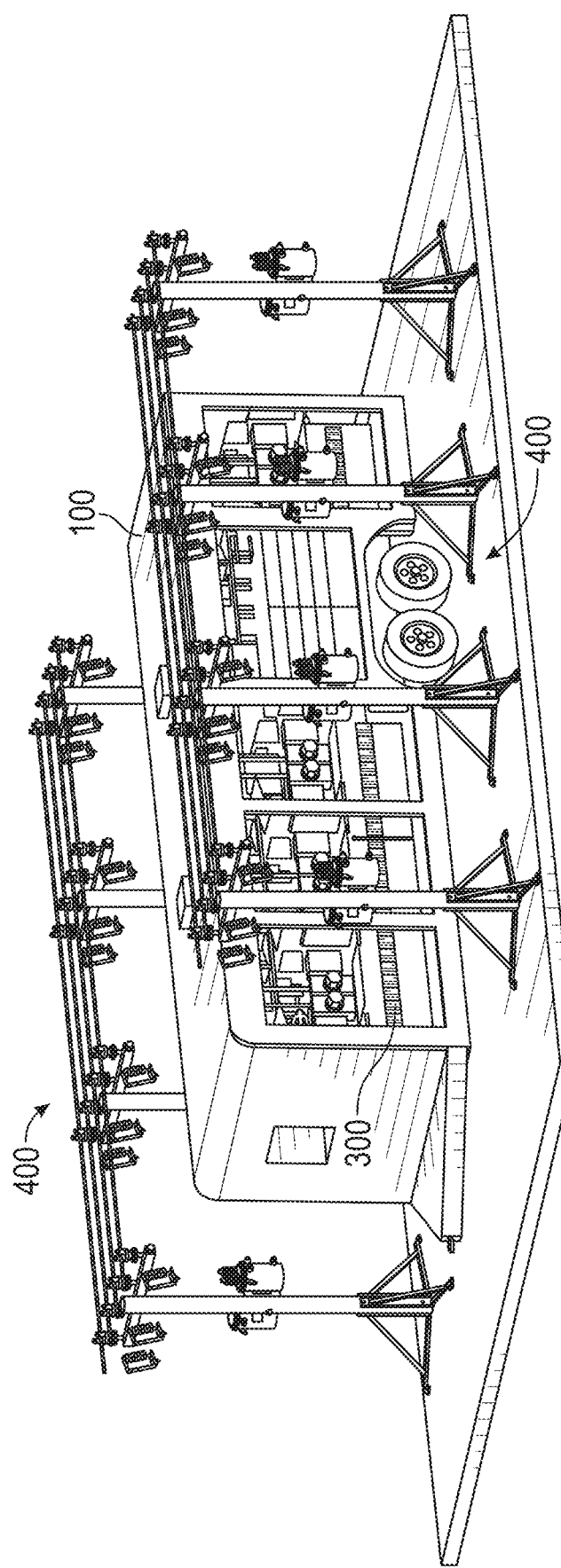

FIG. 6 illustrates another view of a mobile lab 100. In this iteration, load bays 300 can be located on both sides of the mobile training lab 100, which can allow for working areas 400 to be set up on both sides as well.

In a non-liming example for a four pole setup for a mobile lab 100, the following equipment can be provided:
4 Mobile load centers
2 Backfeed residential houses
2 Sawmills
4 Switch sticks
4 Shotgun sticks
4 Ladders
Power pole
3 Standard poles
Power crossarm
3 Standard crossarms
Power control package
12 training transformers
Buss package
Mobile lab racking system The above is merely an example of equipment that can be used, and some or all of the equipment may be included.

Stationary Lab

In some embodiments, a mobile training lab may not be used, and instead a stationary lab can be set up. The design and setup can include similar components as discussed above, with some modifications. Thus, all of the equipment discussed above can be included in the stationary training lab, and vice versa. The stationary training lab 500, shown in FIG. 7, can be useful for setup in an interior surface where the mobile training lab 100 may not be able to access. Further, the stationary training lab 500 can remain on location for longer time periods than the mobile training lab 100. Advantageously, the stationary training lab 500 can have a customizable layout as desired. Further, the stationary lab 500 can be scalable in size, and can include more or less equipment depending on the needs. Thus, the stationary lab 500 can be useful for co-ops and major utility corporations alike. Moreover, the stationary lab 500 can be installed at an onsite location, such as within a warehouse or other building, or outdoors in a parking lot or other area.

Figure 7:
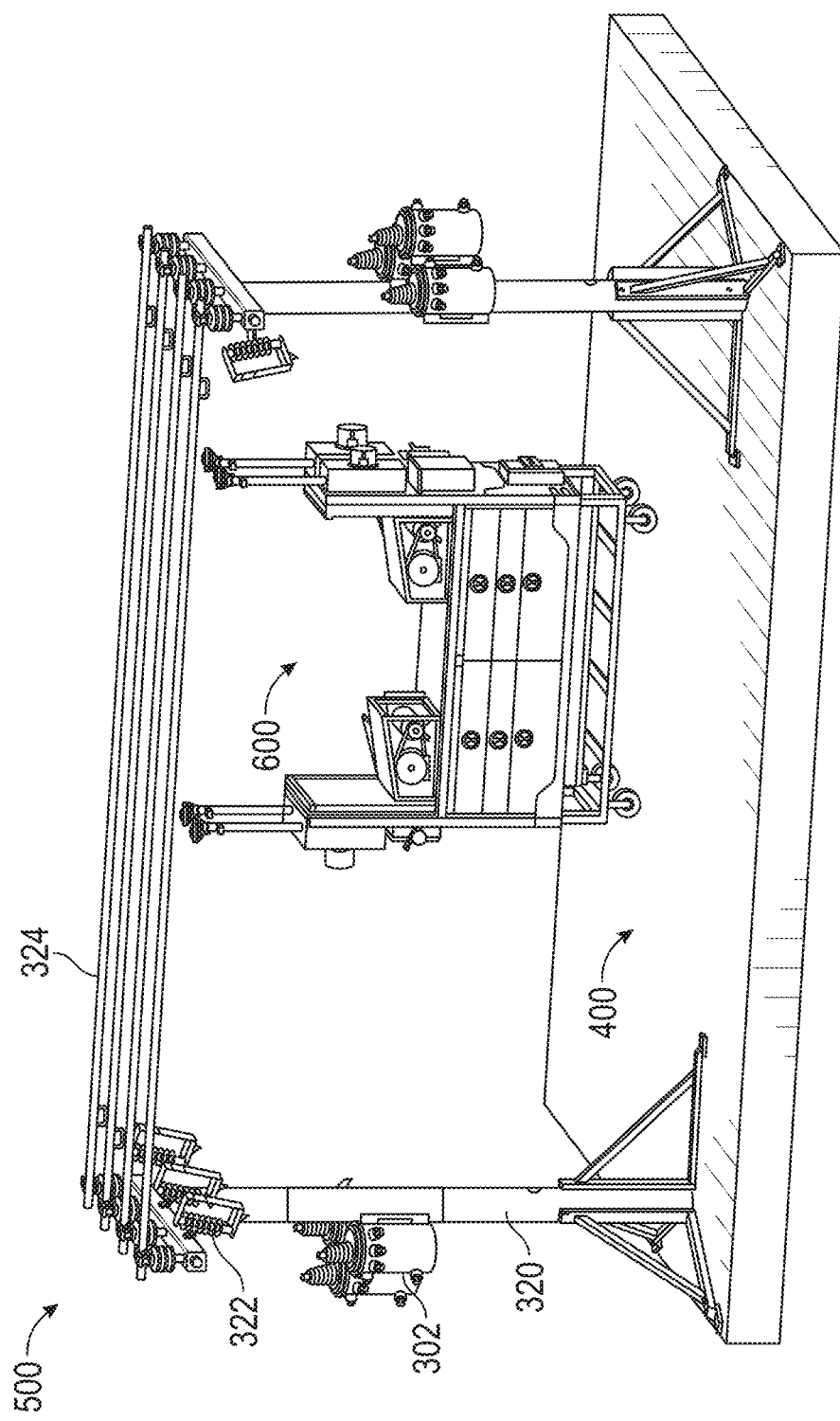
FIG. 7 illustrates a transformer training unit stationary setup.

Instead of using the load bays 300 discussed above with respect to the mobile training lab 100, individuals can instead use load carts 600, such as shown in FIG. 7. The load carts 600 can include all of the same equipment as the load bays 300, but can include wheels or other mobility equipment so that users can move around the load carts 600 to the desired locations. Each of the load carts 600 can include equipment such as sensors, warnings, gloves, drawers, tape, whiteboards, etc. The equipment can be contained within drawers or on shelves of the load cart 600. The load carts 600 can similarly be located next to a working area 400, such as described above, having the poles 320, transformers 302, insulators 322, and wires 324, amongst other equipment.

The load cart 600 can have nearly the same or the same components as the load bay 300, and accordingly can support the meter bases, switches, load panels, kill switches, residential two circuit house with backfeed component, commercial three phase motor with rotation arrows weather heads, service wire attachments drawer(s) for tools and misc. and a dry erase boards. They all have a metal tube construction with a dielectric composite sheathing.

Figure 8:
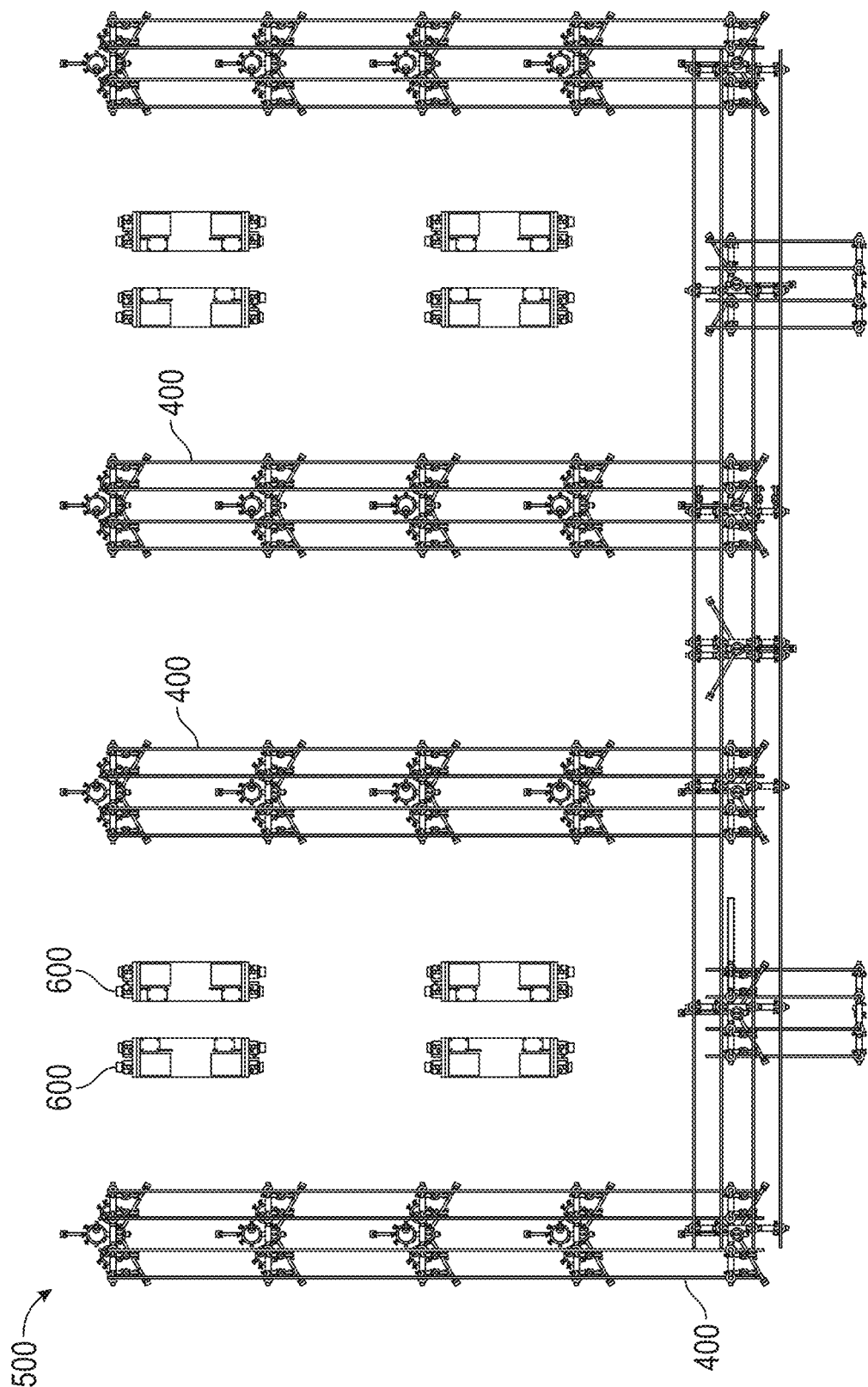
FIG. 8 illustrates embodiments of training unit setups.

FIG. 8 illustrates a top-down view of an example setup of a stationary training lab 500. As shown, the stationary training lab 500 can include a number of the load carts 600. The load carts 600 can be generally surrounding by the live training equipment, such as including the poles, wires, transformers, etc. discussed above in the working area 400. In some implementations, a power source, such as a 120-208 Vac generator, is provided with the stationary lab 500. In some embodiments, the power source may not be provided.

However, FIG. 8 illustrates merely one potential setup for the stationary training lab 500, and different setups can customized and used as well. For example, advantageously the stationary training lab 500 can be scalable. For example, a 2 pole setup can be used with a single load cart 600. However, 4 pole, 8 pole, 16 pole, etc. setups can be used as well. In some embodiments, a load cart 600 is used for every two poles, though other numbers of load carts 600 can be used as well. Examples of equipment used for particular setups are discussed below:

2 Pole
   Load center
   Standard residential house
   Backfeed residential house
   2 sawmills
   2 switch sticks
   Ladder
   Power pole
   Standard Pole
   Power Crossarm
   Standard Crossarm
   Power control package
   6 training transformers
   Buss packages 4 Pole
   2 Load centers
   2 Standard residential houses
   2 Backfeed residential houses
   4 sawmills
   4 switch sticks
   4 Ladders
   Power pole
   3 Standard Poles
   Power Crossarm
   3 Standard Crossarm
   Power control package
   12 training transformers
   Buss packages 8 Pole
   4 Load centers
   4 Standard residential houses
   4 Backfeed residential houses
   8 sawmills
   8 switch sticks
   8 Ladders
   2 Power pole
   6 Standard Poles
   2 Power Crossarm
   6 Standard Crossarm
   2 Power control package
   24 training transformers
   Buss packages Example equipment that can be included in the stationary training lab 500 are shown below, though the particular equipment is not limiting.

Primary buss energized 120/208 vac 3 phase, 4 wire
   Composite crossarms with energized system indicators
   Fused disconnects with energized and phasing indicators
   Power control center
   Durable aluminum poles
   Single phase and three phase transformer installations. Transformers can be designed with a 120 v or 208 v primary rating and a 120/240 v secondary rating, but the particular ratings are not limiting. Advantageously, an individual can connect nearly every bank possible; Wye or delta, primary and secondary. This can include single phase transformer installations, single phase paralleling installations, three phase open banks, three phase closed banks, three phase paralleling installations, and rotation and phase sequencing.
   Single phase meter with meterbase, load panel and 1-phase "residential home" customer
   Three phase meter with meterbase, gang switch and three phase "sawmill" customer
   Dry erase surfaces allow trainees to draw connection diagrams, rotation schematics and more
   Slide out drawers for storage of test equipment, tools, connectors and curriculum All of the equipment for the stationary lab 500 can be broad in a vehicle or multiple vehicles for setup.

Modified Equipment

Embodiments of the disclosed labs, either stationary or mobile, can include a number of modifications to commonly used components in order to properly operate with use of the lab. The modified equipment is discussed with respect to FIGS. 9-18.

FIGS. 9A-9C illustrates an embodiment of a unique transformer 302 design with a housing 902 and an attached lid 901. FIGS. 10A-10E illustrate a hingeable version 900 of such a transformer, and thus the components described with respect to either transformer 302/900 can be interchangeable. As shown, the transformer 900 can include a housing (e.g., body) 905. The body 905 in some embodiments can be generally cylindrical, though the particular shape is not limiting. The body 905 can contain a hollow interior for storing any necessary electrical equipment for operation of the transformer 900.

Figure 10A:
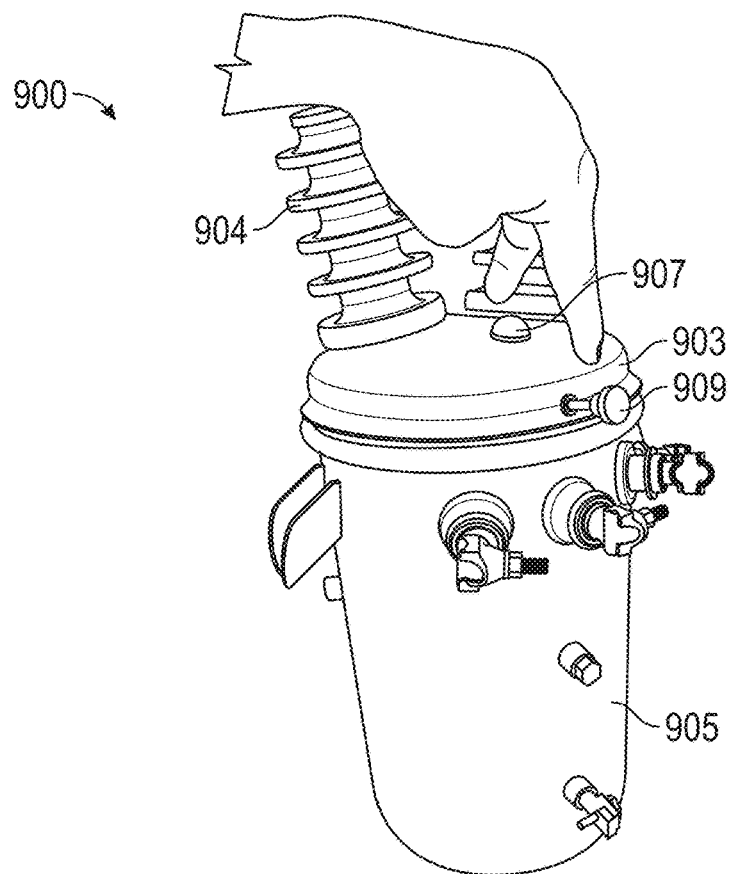
FIGS. 10A-10E illustrate an embodiment of a hingeable transformer which can be used with the training labs disclosed herein.
Figure 10B:
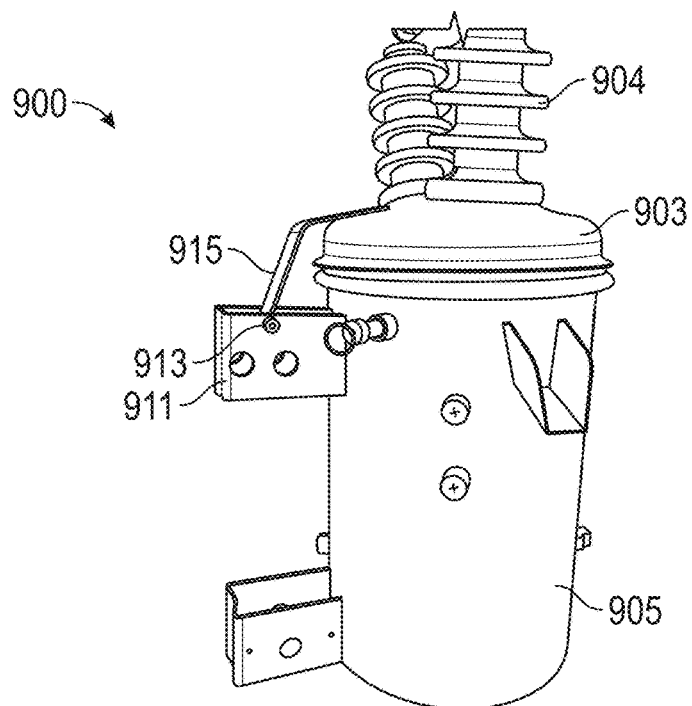
Figure 10C:
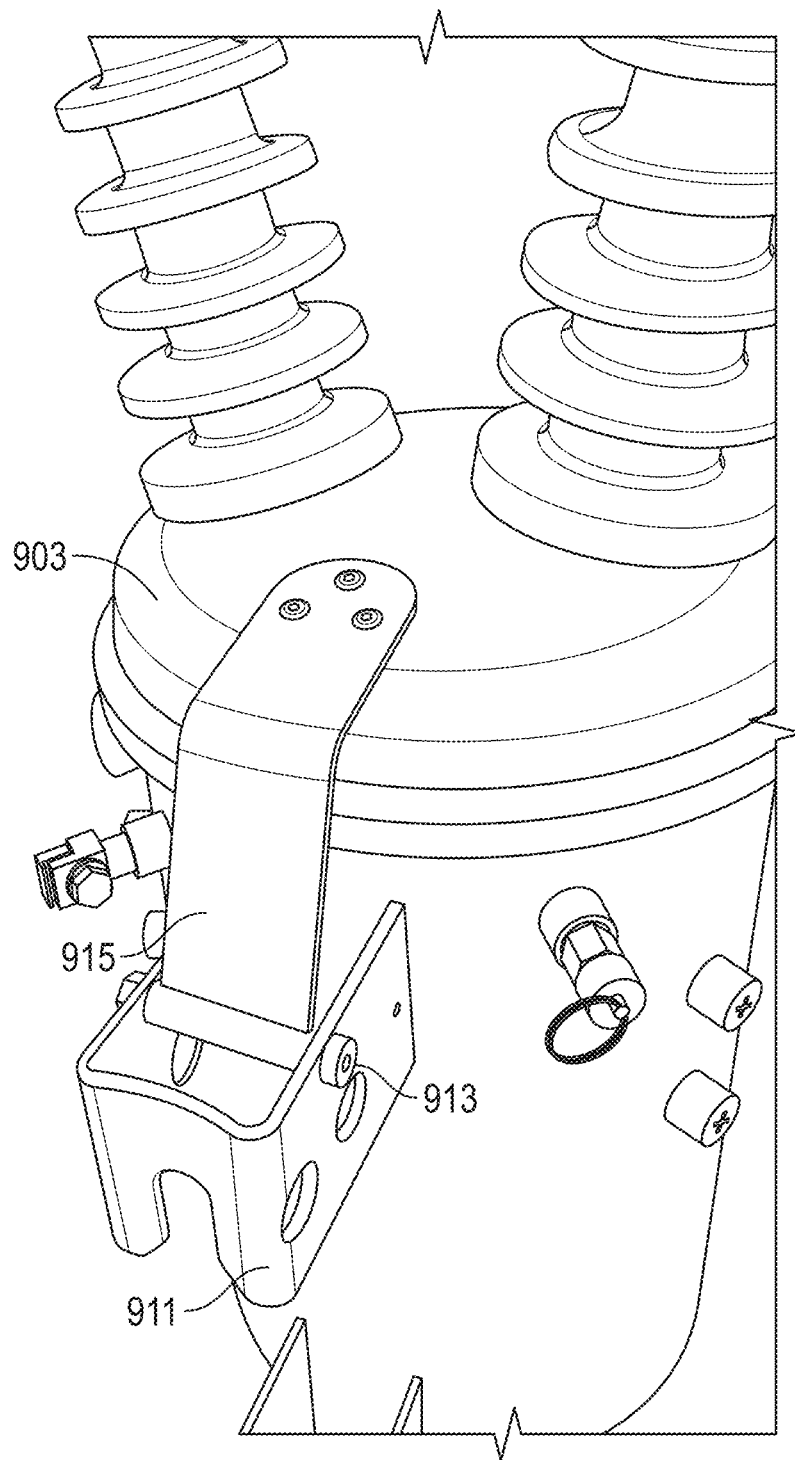
Figure 10D:
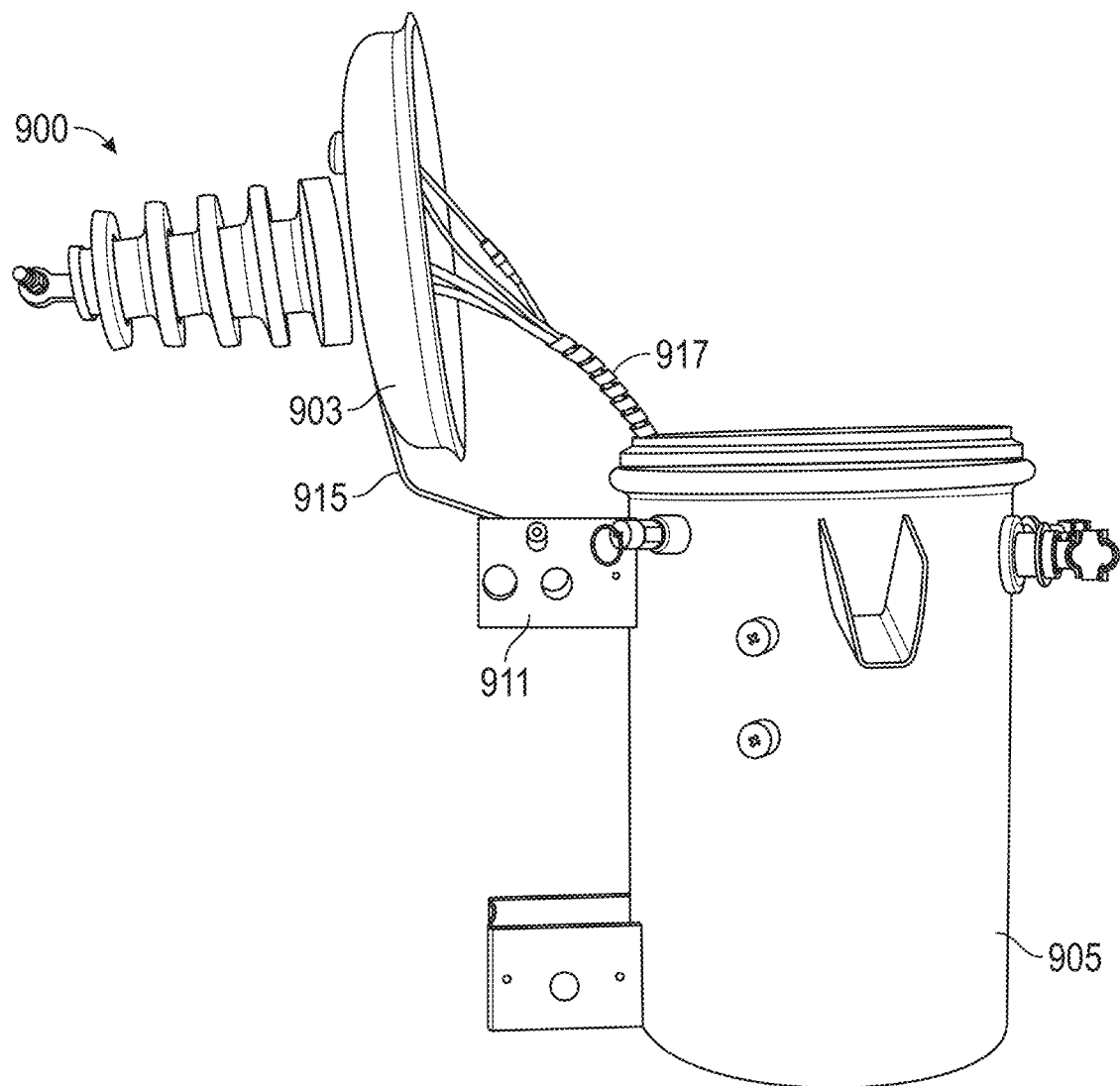
Figure 10E:
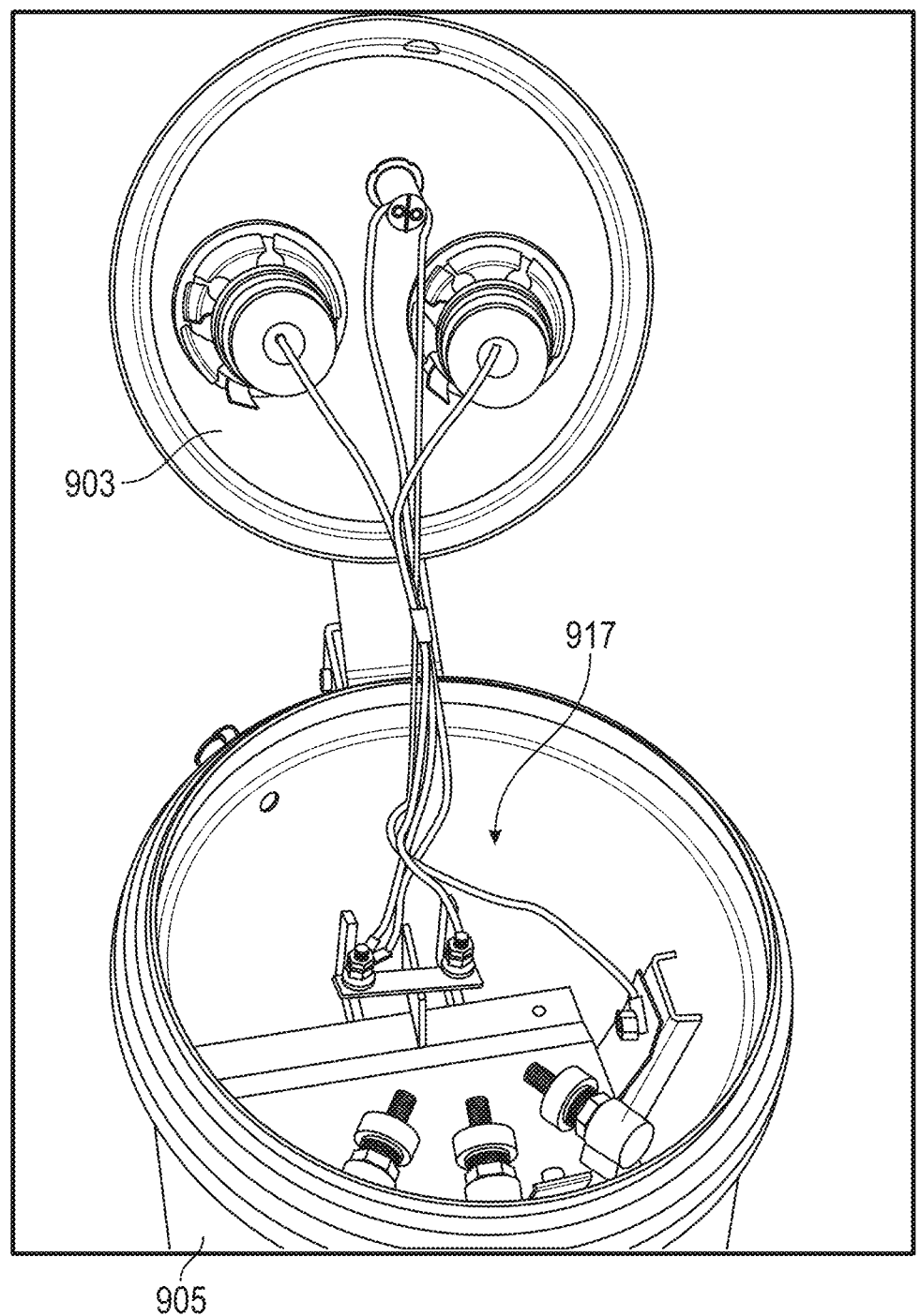

As mentioned, the transformer 900 can include a hingeable lid (e.g., a quick access hingeable lid) 903 at the top of a body 905 to allow easy access to the wiring leads on the inside of the transformer 900, so the transformer leads can easily be reconfigured to allow true banking just like in the field. In some embodiments, the body 905 can include an extension (e.g., bracket) 911. The extension 911 can extend outwards from an outer surface of the body 905. The extension 911 can be located on an upper half of the body 905, though the particular location is not limiting. The extension 911 can be formed from two side walls connected by a back wall, such as shown in FIG. 10C. The back wall can include a cutout for ease of attachment onto the pole 320 or transformer bracket 930. The sidewalls can contain apertures for attachment of a hinge 913 which can extend between the two side walls. The hinge 913 can be moved to any of the apertures. A hinge arm 915 can be attached to the hinge 913 at a first end of the hinge arm 915, which allows the hinge arm 915 to rotate with respect to the extension 911. Further, a second end of the hinge arm 915 can be attached to the lid 903. Thus, rotation of the hinge arm 915 can rotate the lid 903 between a closed (shown in FIGS. 10A-10B) and opened (shown in FIGS. 10D-10E) position showing electronics 917. The hinge arm 915 can be permanently attached to the lid 903, such as through bolts or rivets, or may be rotatably attached to the lid 903 to allow for a further axis of rotation. The lid 903 can be secured in a closed position, for example, by a thumb screw or other attachment mechanism (e.g., lock) 909. In the open position, the internal area of the body 905 can be accessed. In some embodiments, the lid 903 is fully removable. In some embodiments, the transformer 900 can include a sealing ring or gasket. For example, the sealing ring can be located on an outer surface of the body 905 so that when the lid 903 is closed, the sealing ring provides a seal between the two components. The sealing ring may be rubber or polymer, and the specific material is not limiting. Thus, the inner surface of the lid 903 can be sized to fit around a portion of the body 905. In some embodiments, the body 905 can include a stepped inward or narrower section at the top for ease of attachment of the lid 903. Thus, when closed, the lid 903 can rest on an upward facing surface of the body 905.

The transformer 900 can further include a status light 907 on the lid 903. In some embodiments, primary insulators 904 located on an outer surface of the lid 903 have been cut off under the lid 903 as well so that they do not extend under the lid 903. All of the above-described features can allow for ease of replication of nearly all different types of connections made in the field. Additionally, the transformer 900 can be an air-cooled unit that closely resembles pole mounted units used in the industry.

Further, embodiments of the disclosure can use a continuity transformer 1000, shown in FIGS. 11A-11E. The continuity transformer 1000 can be used in combination with a continuity meter to show if a transformer, such as transformers 302/900, is connected internally correct or incorrect. For example, the continuity transformer 1000 can replicate common problems with transformers in the field.

As shown, similar to the above the continuity transformer 1000 can have a base housing 1002 and a lid 1004, which may or may not have insulators 1003. The continuity transformer 1000 may include some or all of the features discussed above, such as a hingeable lid.

Figure 11A:
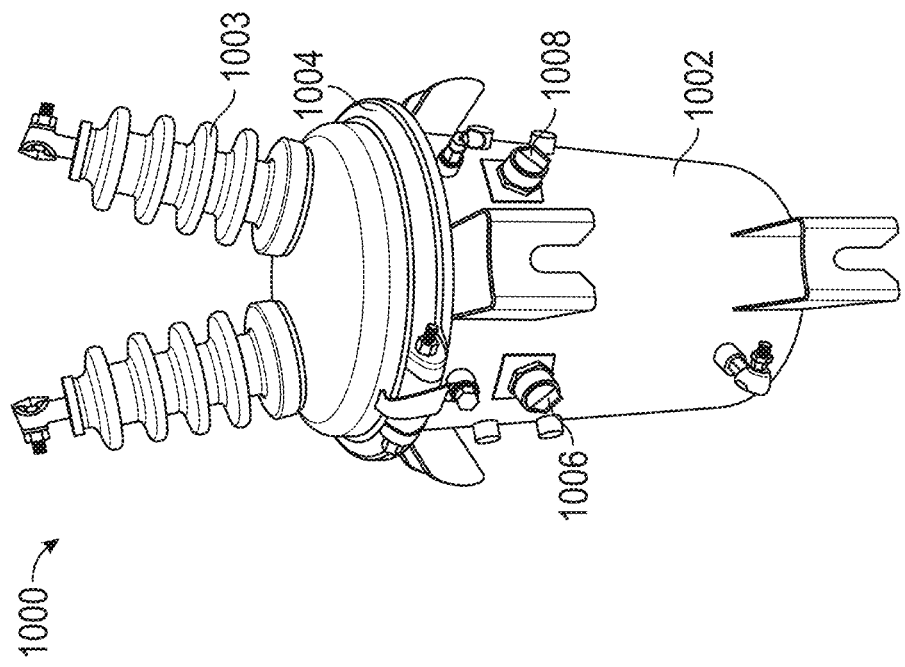
FIGS. 11A-11D illustrate an embodiment of a continuity transformer which can be used with the training labs disclosed herein.
Figure 11B:
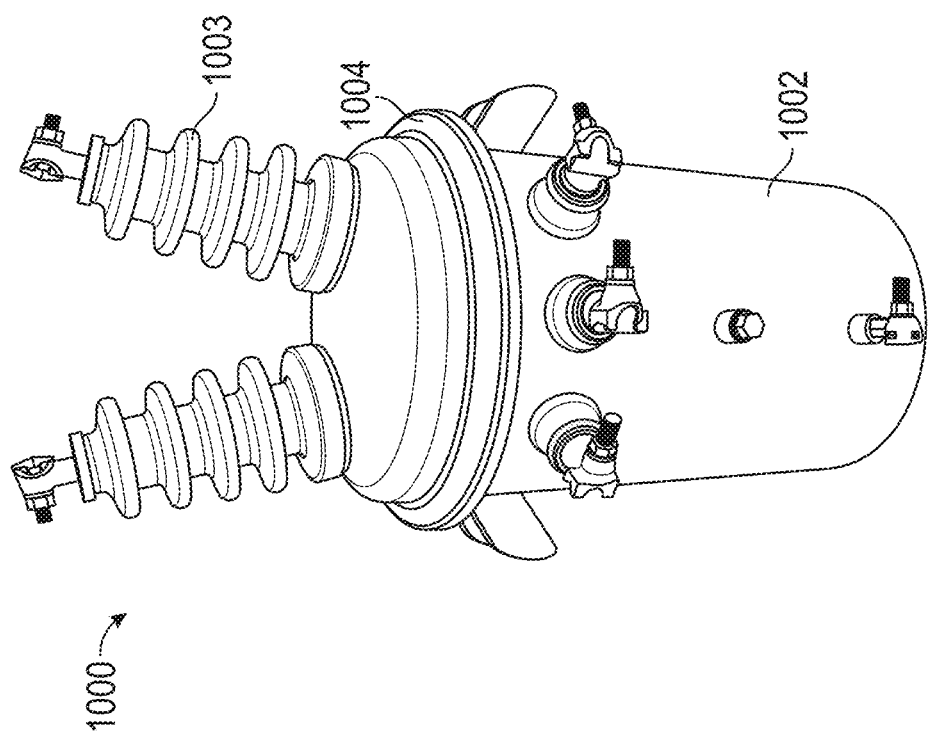
Figure 11C:
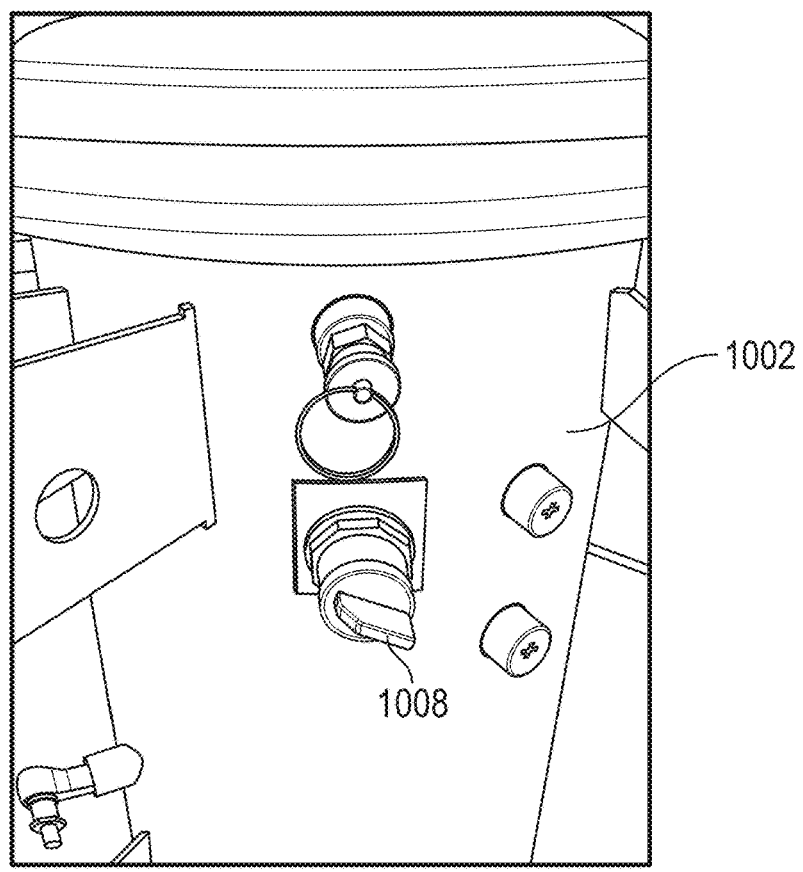
Figure 11D:
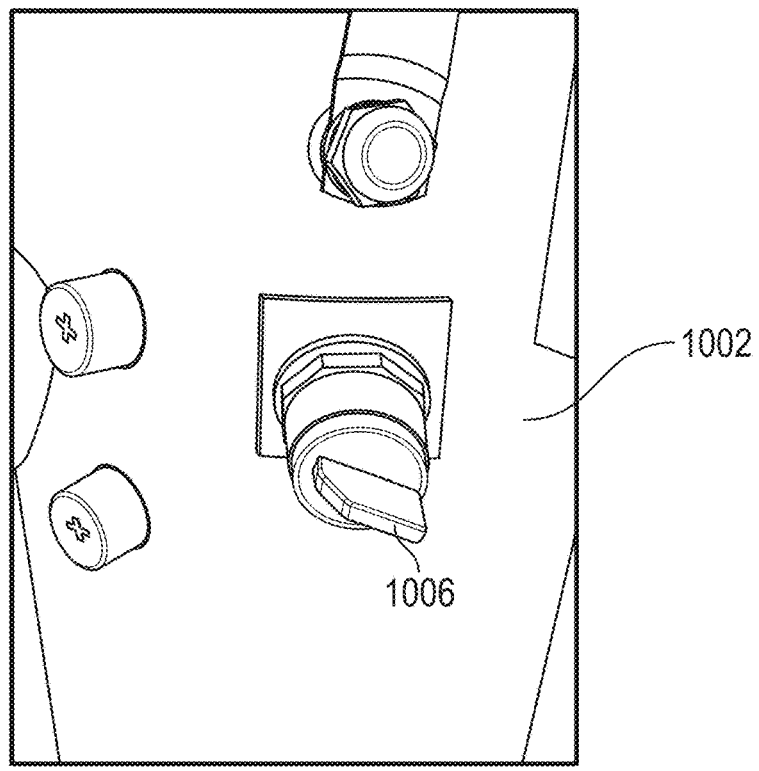
Figure 11E:
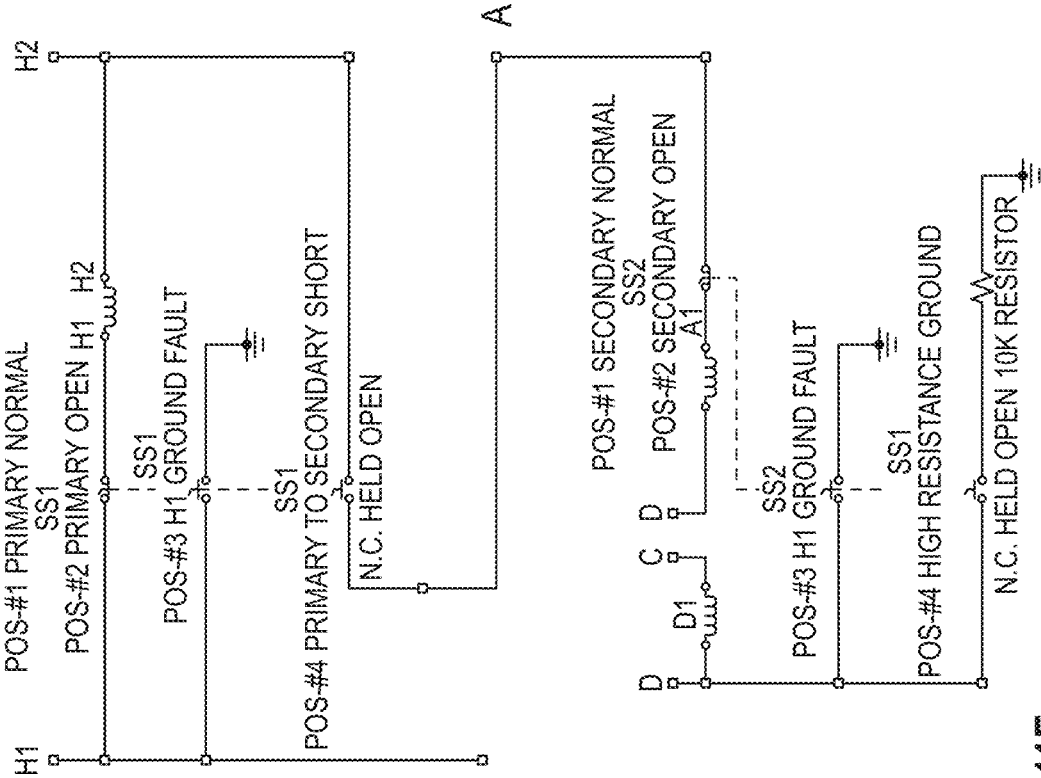
FIG. 11E illustrates an electrical schematic for an embodiment of a continuity transformer.

Further, the continuity transformer 1000 can include two deck switches (e.g., actuators, buttons) 1006/1008 that create open points and/or shorts in the primary and secondary windings. FIG. 11E illustrates an example circuit diagram showing the different operations of switched 1006/1008. In some embodiments, there can be two deck switches that are connected to all the leads on the transformer core that can short, open, ground and create a high resistance fault at either the X and or the H bushings. In some embodiments, no power is required, and just a continuity meter will tell an individual if windings are shorted together or open and not connected correctly. To find a high resistant fault, a megger can be used to induce a voltage until the short is exposed by use of a resistor that acts as a high resistance fault. There is no other transformer known in the art that can show examples of internal faults, shorts, opens or normal internal connections as performed by the continuity transformer 1000.

Figure 12A:
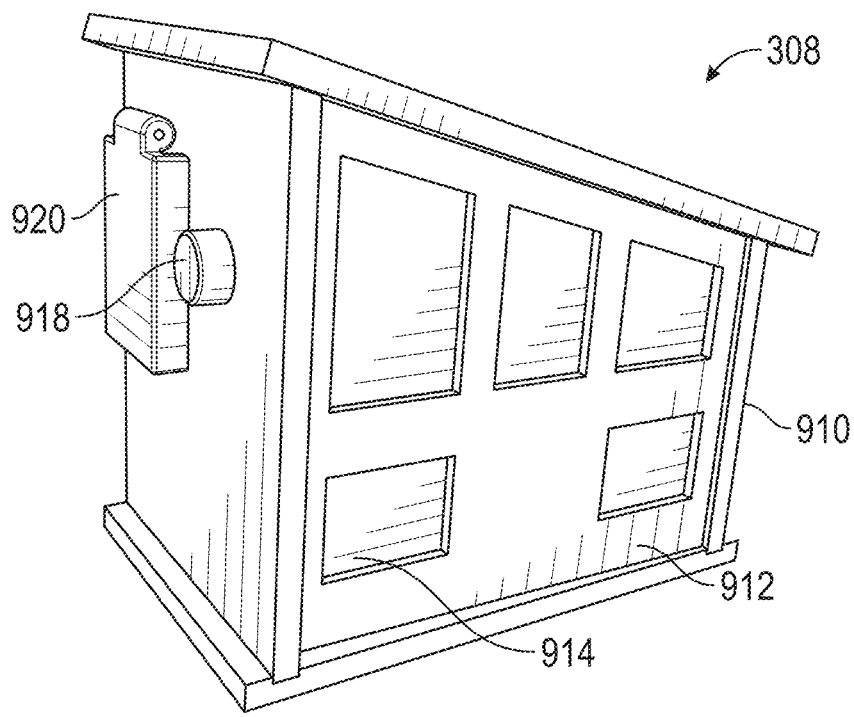
FIGS. 12A-12B illustrate embodiments of a residential housing system that can be incorporated into the training lab.
Figure 12B:
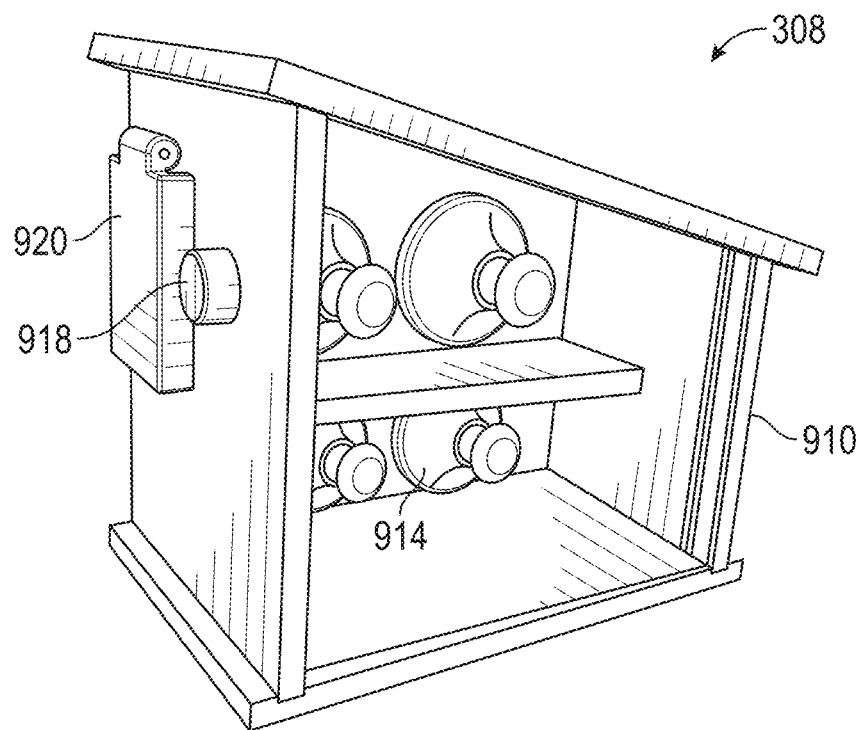

Following, FIGS. 12A-12B illustrate a specialized residential home equipment 308 with the housing (FIG. 12A) and without a portion of the housing removed (FIG. 12B). As shown, the home equipment 308 can include an outer housing 910 forming a generally house shape, though the particular shape is not limiting. The housing 910 can include a removable front panel 912 which can contain a plurality of windows 914, formed of clear plastic or glass. Within the housing, 910, shown in FIG. 12B, are one or more light bulbs and sockets 916.

The home equipment 308 can further include button 918 (e.g., actuator, switch, momentary switch) which can be energized when a power supply is plugged into the feedback outlet 920 (e.g., backfeed outlet). When you depress the button 918, one house circuit can be energized by one phase which can create a backfeed situation at the meter base. If not isolated by opening the main disconnect at the single phase load panel, or removing the meter, the power will travel through the meter base, meter, service wire, and to and through the transformer at which time, depending on if and how the transformer is banked and wired, possibly is converted to energize three phases all the way to the primary buss and continuing to another or multiple pole locations.

As mentioned, the residential home 308 has two lighting circuits that can be energized and are activated using the load panel. A special backfeed receptacle and momentary switch 918 can be wired to the residential house 308 to recreate a hazardous condition that happens on the power systems usually occurring during or after a power outage on the distribution powerlines. The home 308 has two circuits that can be energized and if improperly wired one circuit, or both, will not function correctly. Two circuits minimum are used to demonstrate this. Thus, the home equipment 308 can provide training to an individual.

Figure 13:
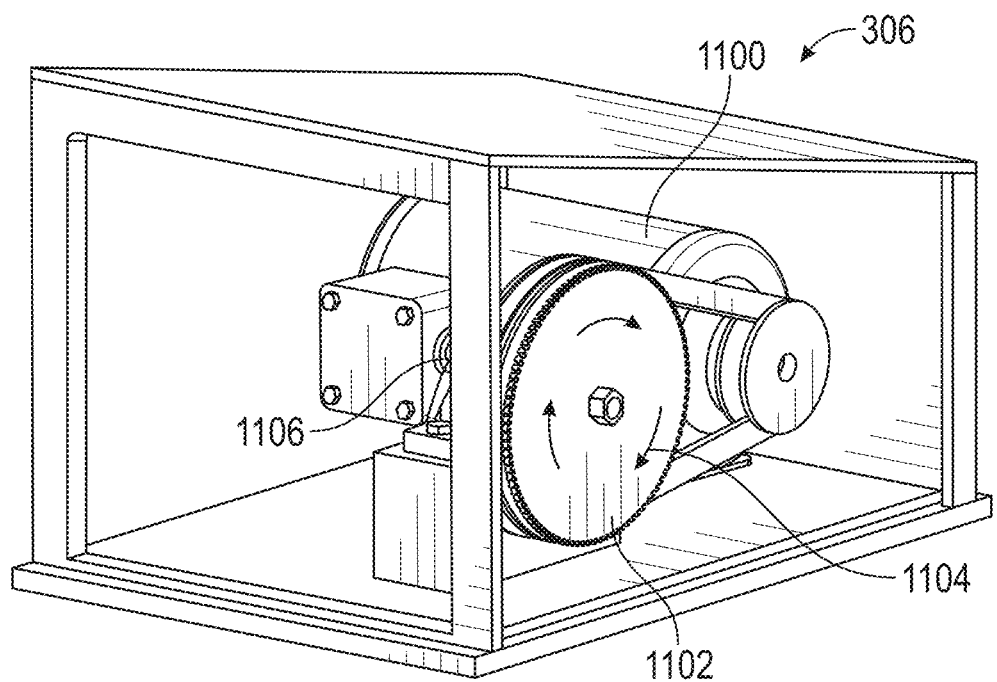
FIG. 13 illustrates an embodiment of a sawmill that can be incorporated into embodiments of the disclosed training labs.

FIG. 13 illustrates an embodiment of a representation of a three phase motor component (e.g., sawmill) 306 which has a wired three phase motor 1100 that spins a blade 1102 that has arrows 1104 to show the rotation direction of the motor 1100 based on the proper or improper wiring of the transformers to the motor 1100. Now the rotation can be visually seen and noted as clockwise or counterclockwise by the arrows 1104 on the blade 1102. Rotation is typically referenced and marked in the field based on use of a rotation meter which is used by electrical technicians in the field. Also mounted to the motor is a safety light 1106 to show that the motor is energized to be referenced when an event has occurred and the motor is not turning but is partially energized "Single Phasing". The safety light can be mounted on an inside of the sawmill 306, for example on the splice box of the motor, which is located between the saw blade 1102 and the motor 1100.

Figure 14:
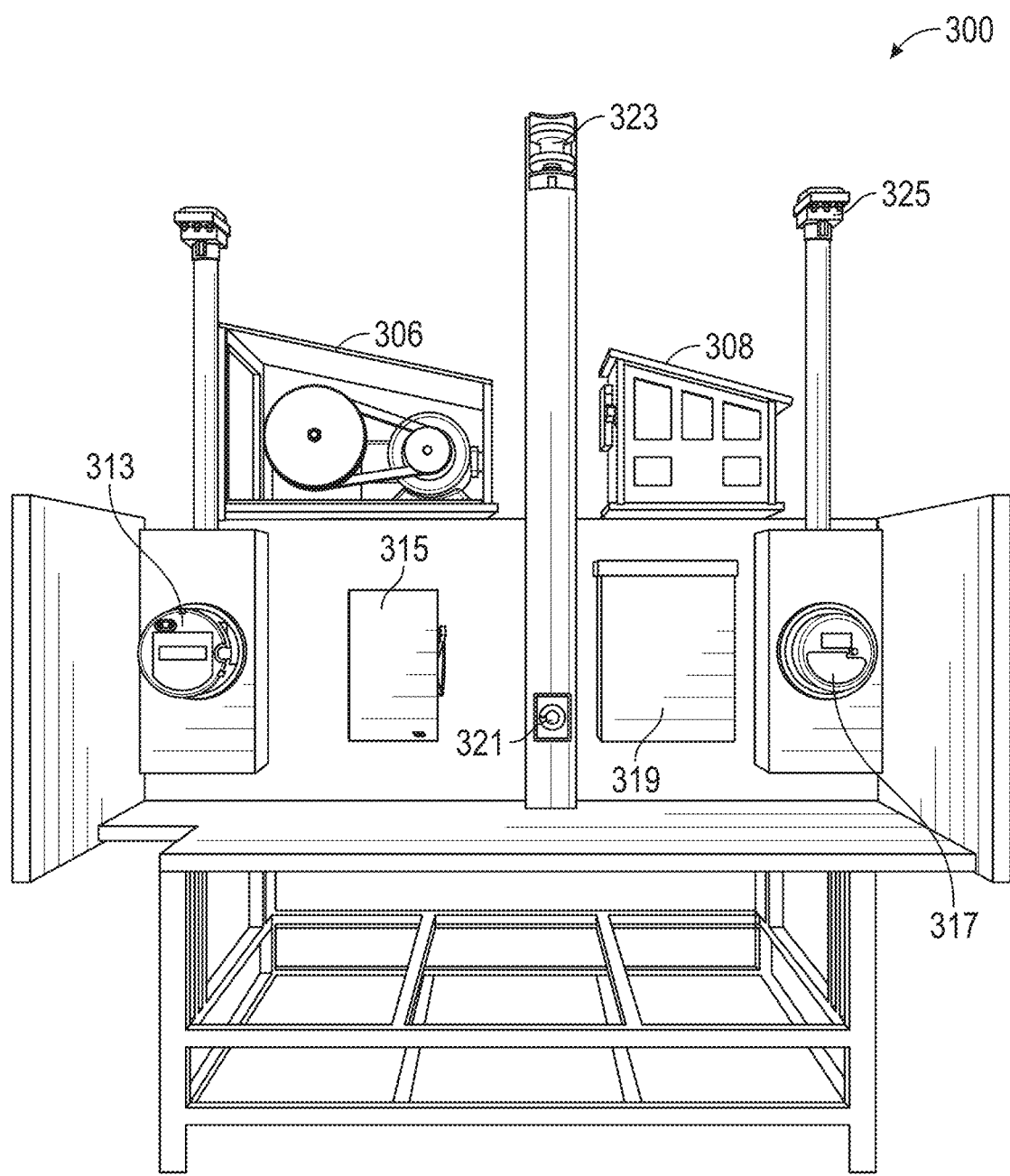
FIG. 14 illustrates embodiment of a load bay including the equipment shown in FIGS. 10-12.
Figure 15A:
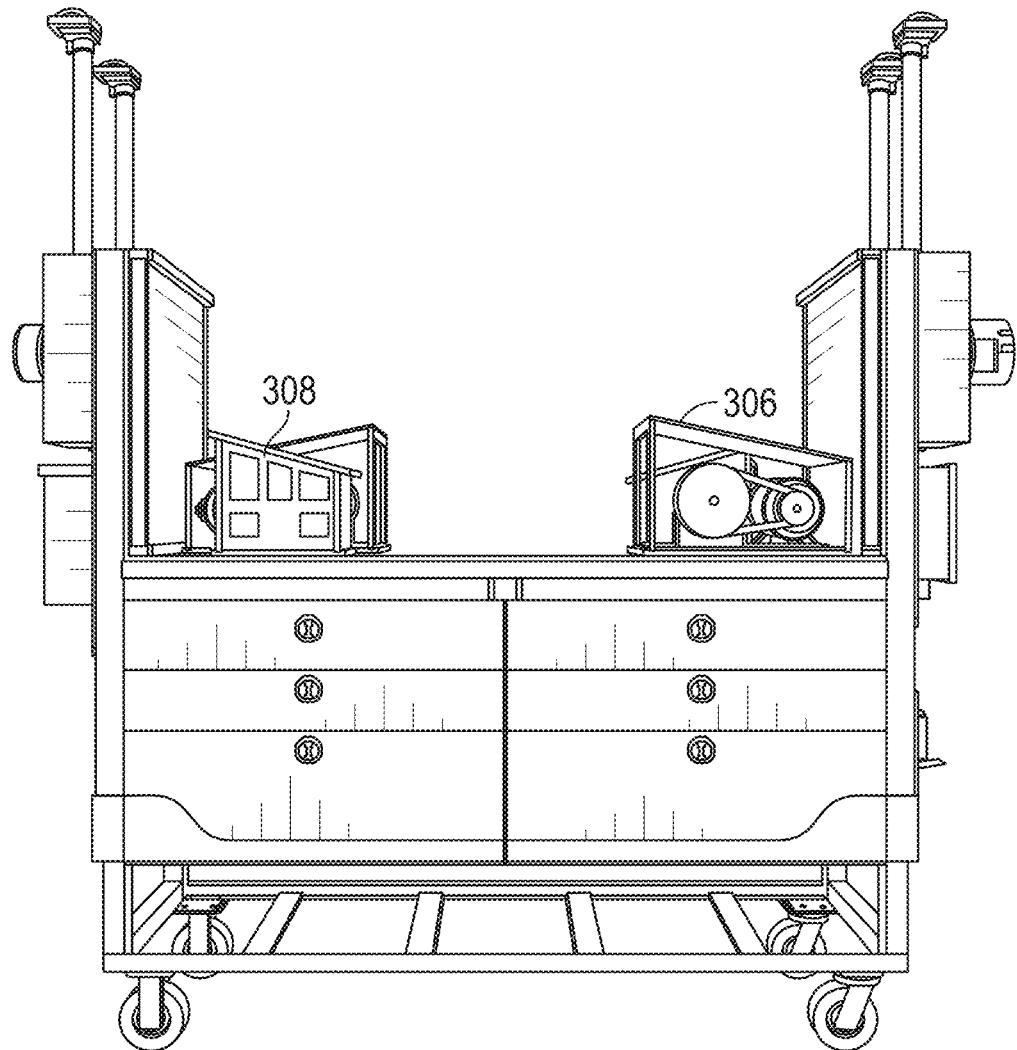
FIGS. 15A-15B illustrate embodiments of a load cart.
Figure 15B:
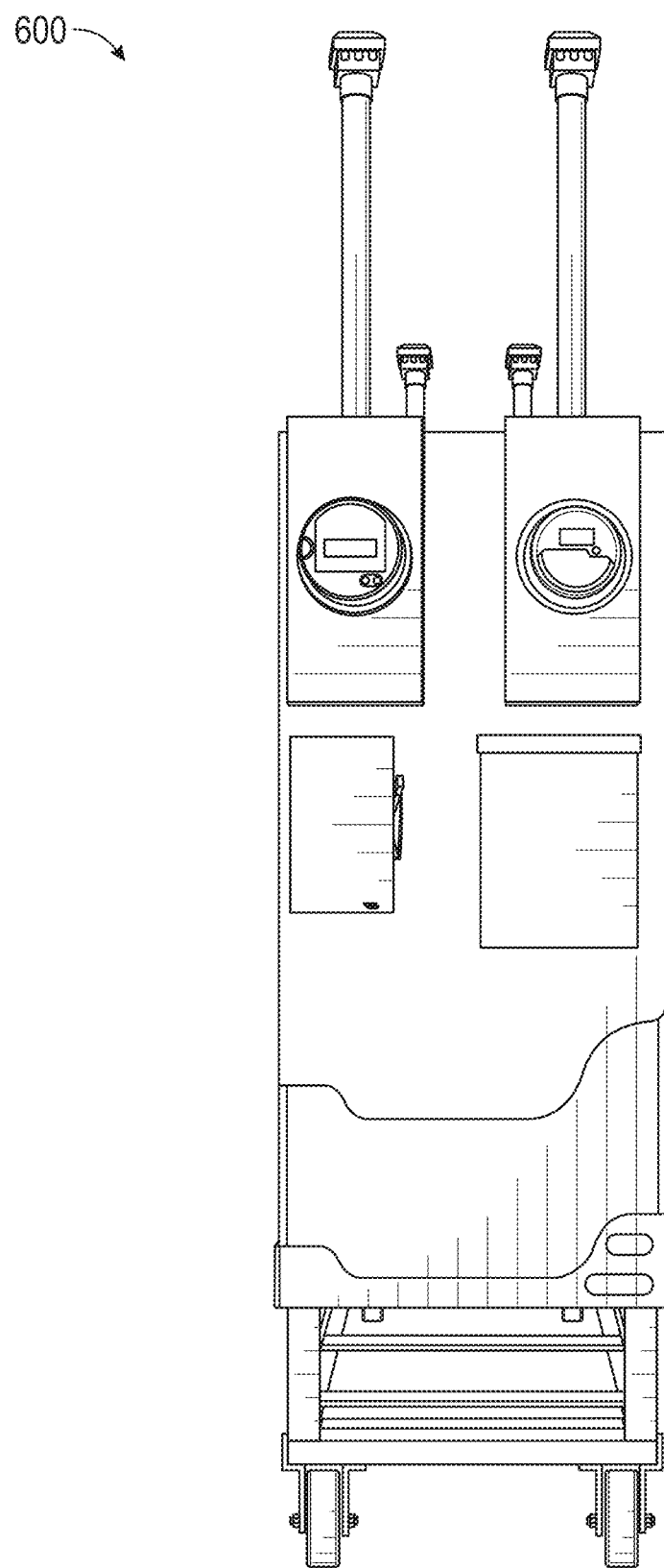
Figure 16:
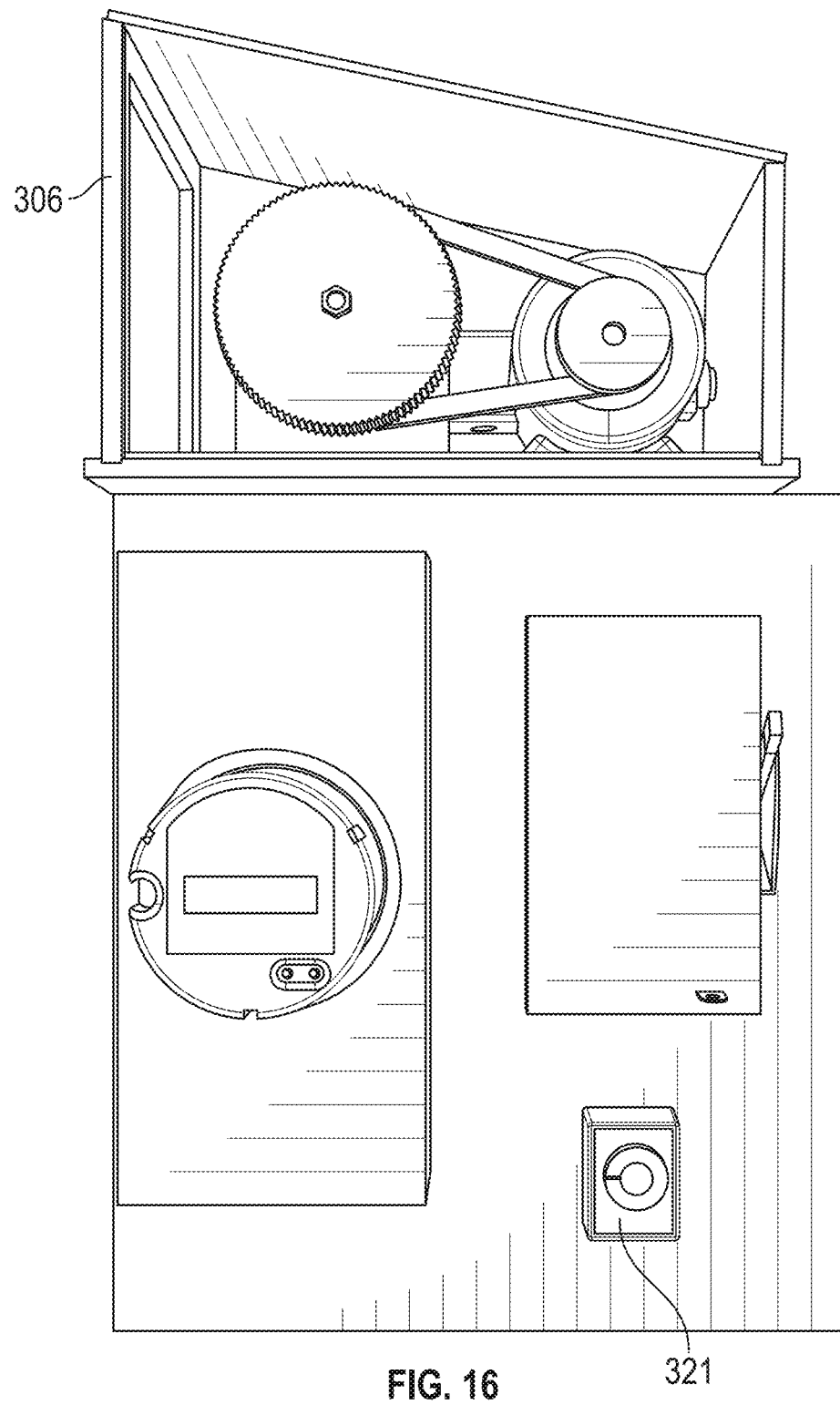
FIG. 16 illustrates an alternate configuration of a residential housing system.
Figure 17:
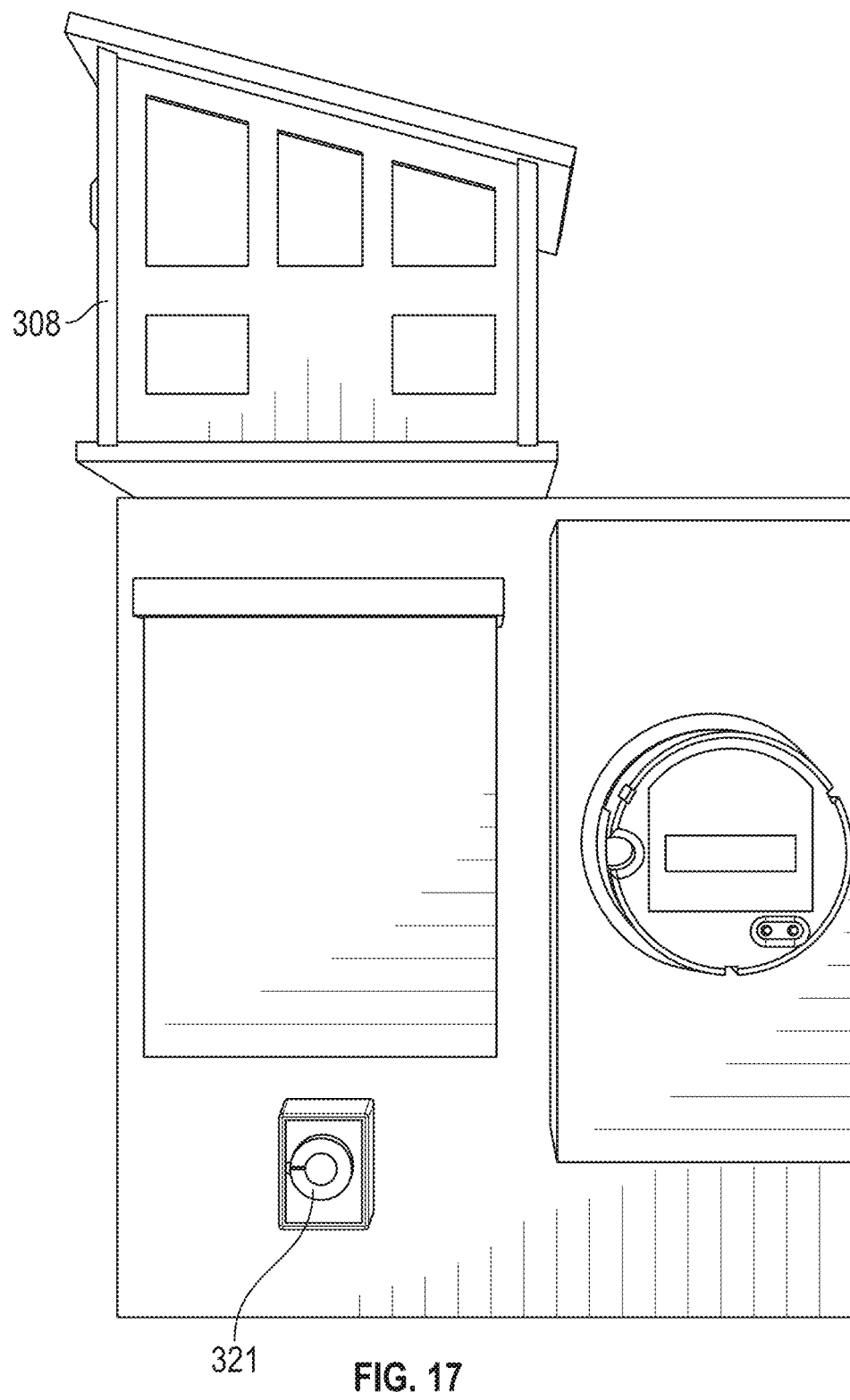
FIG. 17 illustrates an alternate configuration of a sawmill.

FIG. 14 illustrates the above-described equipment located on the load bay 300, where FIGS. 15A-15B illustrate the above-described equipment located on the load cart 600. Some equipment is described relative to FIG. 14, but it will be understood that said equipment can be used with the load cart 600, or other alternate configurations such as shown in FIGS. 16-17. In some embodiments, all or some of the described equipment can be included. In some embodiments, the load bay 300 can include a three phase meter 313. Further, the load bay 300 can include a three phase gang switch 315. Additionally, the load bay 300 can include a single phase meter 317 and a single phase load panel 319. As one of the safety features discussed herein, each load bay 300 can include an emergency kill switch 321. In some embodiments, the load bay 300 can further include a service attachment spool insulator 323 and a weather head 325.

Figure 18:
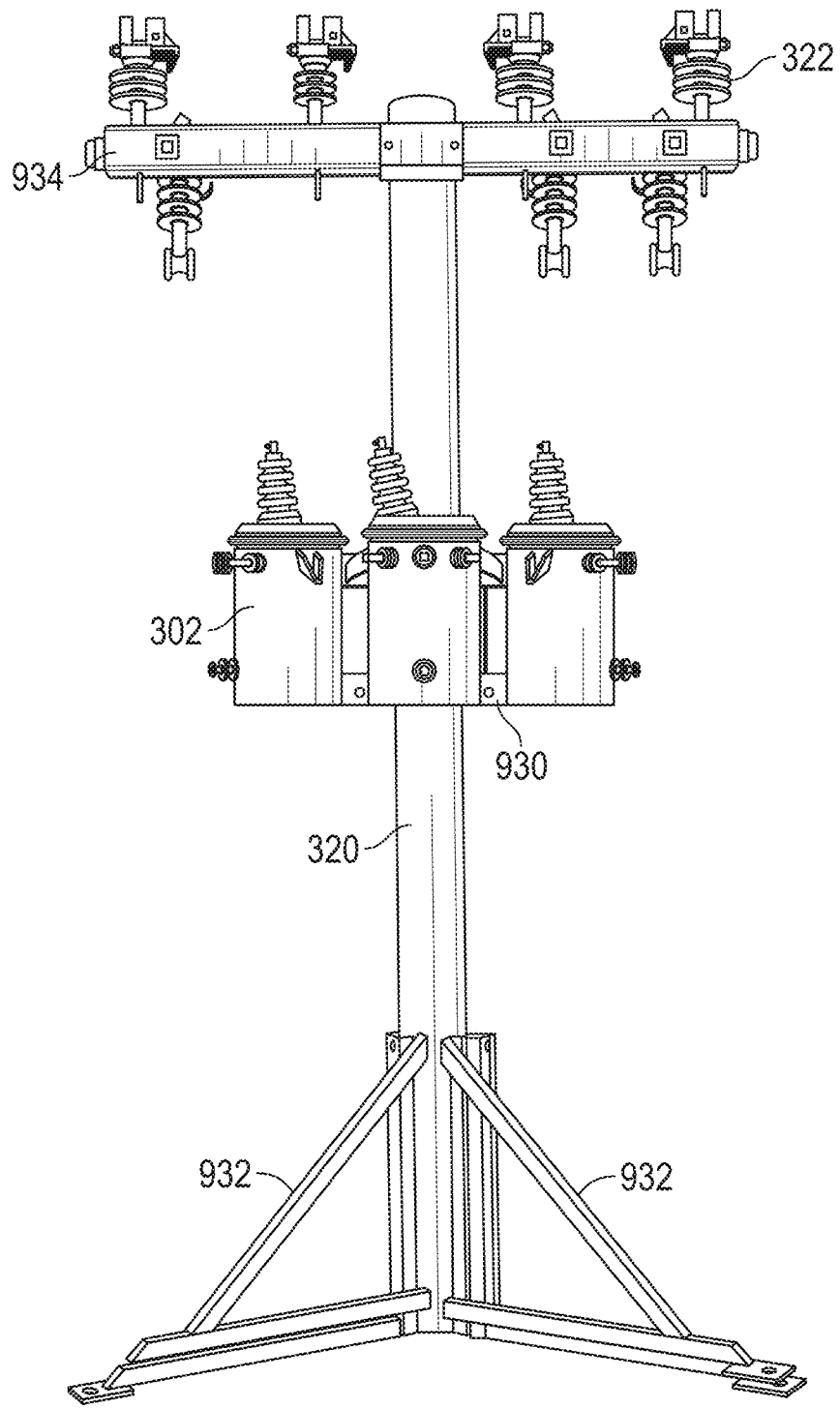
FIG. 18 illustrates an embodiment of a pole assembly which can be used with the disclosed training labs.

In some embodiments, the poles 320 used for hanging the transformers and wires have been modified such as shown in FIG. 18. Specifically, the poles 320 can be uniquely designed with a three transformer bracket 930 to easily allow transformers to be installed quickly and securely and uninstalled quickly so as to not spend unnecessary training time installing transformers. Additionally, there are three support legs 932 that support each pole such as shown in FIG. 7. The support legs 932 can be bolted into the ground, or otherwise attached. In some embodiments, Keen Inserts can be used to bolt the support legs 932 into the ground.

In some embodiments, on each pole there can be a saddle/bracket that the crossarm 934 sets in. Both the crossarm 934 and the bracket can have one or more holes, such as two holes, that can be aligned. Thus, crossarm 934 and the bracket can be pinned/attached temporarily or attached, such as bolted, together for permanent installations.

Another modification has been made to the crossarms 934 mounted onto the poles 320. In some embodiments, the crossarms 934 are made from high strength dielectric fiberglass tubes that are mounted at the top of the pole 320. Each of the crossarms 934 can have safety lights on each end that illuminate when the lab is energized. Further, bolted to the crossarm 934 are common clamp top insulators that have been specially wired to allow the metal clamp sides to be utilized as electrodes to energize the buss and bring power to each pole 320 and or to allow the safety lights to be illuminated when lab is energized. Additionally, the crossarm 934 can support cutout or fused disconnect switches which use a small gauge wire and plug connect to receptacles built into the crossarm 934 and connected to the wiring harness and the buss bar. In each crossarm 934 there is a wiring harness that connects all grounds, safety lights and, specially designed redundant ground plunger contact and on the power pole only a specialty trouble shooting phase open/close switch and a plug that connects the to the power supply power pole wiring harness.

Next, the busses are aluminum tubes with stirrups welded on to allow connection to the fused cutouts. Not only does the tube conduct the electricity, it also provides addition strength to the structural integrity of the lab.

The fuse cutouts or fused disconnects operate just like they do in the field. However, there is an added bracket with a built in light that is added to the bottom of the cutouts, the lights are color specific to not only show that the bottom side of the cutout is energized and a potential back feed hazard, but also to show phase identification. In some embodiments, red light represents A phase, white light is B phase, and blue light is C phase, though the particular colors are not limiting.

Method of Setup

Discussed herein is an example of a setup that can be used for either of the above training labs, be it the stationary lab 500 or the mobile lab 100.

With respect to the mobile lab 100, the mobile lab 100 can be driven/transported to a particular location, such as a building, parking lot, warehouse, etc. All necessary equipment can be fully contained within the mobile lab 100. Once in the proper location, the mobile lab 100 can be parked and any necessary brakes/locking procedures can be used to provide unwanted motion of the mobile lab 100. In some embodiments, the mobile lab 100 can be unhooked or unlatched from a vehicle that has transported the mobile lab 100 to the location. In some embodiments, legs on the mobile lab 100 can be extended to stabilize the lab 100.

After locking the mobile lab 100 in place, the doors 216 on the side walls 210 and back wall 208 can be opened as desired, and if necessary ramps 214 can be withdrawn from the mobile lab 100 to provide access to the interior 212 of the mobile lab 100.

Transformer training equipment can be removed from the interior 212 of the mobile lab 100, such as the poles 320, transformers 302, wiring 324, insulators 211, etc. This can be done by support staff or by individuals who are participating in the training. Further, the equipment can be set up (e.g., staged) outside of the mobile lab 100, such as in the configuration shown in FIGS. 5-6, though other designs/configurations can be formed as well. The modular nature of the mobile lab 100 can provide training to individuals in different conditions. For example, the legs and crossarms can be attached to the poles 320. The poles 210 can then be erected in the working area 400. The poles 320 can be spaced apart and offset from the mobile lab 100, such as by using a buss as a measurement reference. The buss can then be installed onto the crossarms on the poles 320 and secured. Following, power cords can be installed between the power pole 320 and the control panel. Further, a power cord can be installed between the control panel and source power, such as a generator. If source power is from a generator, a lab ground to ground rod can be installed.

Once the equipment is set up in the working area 400, training individuals can access the load bays 300 for additional training equipment, such as disclosed in detail above. The individuals can then perform testing, maintenance, setup, etc. in the working area 400 using the devices and equipment in the individual load bays 300. The working area 400 can be energized as needed for training purposes, and can include all of the sensors, safety features, and generators as discussed in detail above. This can be done as many times as necessary for the training to be complete.

Once training is complete, all equipment from the load bays 300 can be replaced, and the equipment from the working area 400 can be brought back into the mobile lab 100. The doors and ramps of the mobile lab 100 can be closed/withdrawn, and if needed the mobile lab 100 can be reattached to a vehicle.

With respect to the stationary lab 600, the equipment used for the training can be driven/transported to a particular location, such as a building, parking lot, warehouse, etc. For example, a truck, moving vehicle, sports utility vehicle (SUV), or other vehicle may be used to transport all of the equipment.

The transformer training equipment can be removed the transportation vehicle, such as the poles 320, transformers 302, wiring 324, insulators 322, etc., as well as the load carts 600. This can be done by support staff or by individuals who are participating in the training. Further, the equipment can be set up in a location, such as in the configuration shown in FIGS. 7-8, though other designs/configurations can be formed as well. The modular nature of the stationary lab 500 can provide training to individuals in different conditions.

Once the equipment is set up in the stationary training lab 500, training individuals can access the load carts 600 for access to additional training equipment, such as disclosed in detail above. The individuals can then perform testing, maintenance, setup, etc. in the stationary lab 500 using the devices and equipment in the individual load carts 600. The stationary lab 500 can be energized as needed for training purposes, and can include all of the sensors, safety features, and generators as discussed in detail above. This can be done as many times as necessary for the training to be complete.

The stationary training lab 500 can be modified during training as required for training purposes. For example, certain working areas 400 can be added or taken away based on the individual usage. Further, the stationary training lab 500 can be left out in its desired configuration for as long as possible, such as for days, weeks, or months. In some embodiments, the stationary training lab 500 may be permanently set up.

Once training is complete, all equipment from the load carts 600 can be replaced, and the equipment can be brought back into a transportation vehicle. The transportation vehicle can then be removed from the area. In some embodiments, a company can purchase the stationary training lab 500 which may remain in the facility and does not require any of the transportation discussed above.

From the foregoing description, it will be appreciated that inventive training labs are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may" unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A training transformer for simulating one or more fault conditions, the training transformer comprising:
   a housing,
   a primary winding positioned within the housing,
   a secondary winding positioned within the housing, and
   at least one mechanism operable to allow selection between a normal operating condition and one or more fault conditions.

2. The training transformer of claim 1, wherein the at least one mechanism is configured to cause an open condition of the primary winding.

3. The training transformer of claim 1, wherein the at least one mechanism is configured to cause a short between the primary winding and ground.

4. The training transformer of claim 1, wherein the at least one mechanism is configured to cause a short between the primary winding and the secondary winding.

5. The training transformer of claim 1, wherein the at least one mechanism is configured to cause an open condition of the secondary winding.

6. The training transformer of claim 1, wherein the at least one mechanism is configured to cause a short between the secondary winding and ground.

7. The training transformer of claim 1, wherein the at the at least one mechanism is configured to cause a high resistance ground fault between the primary winding and ground.

8. The training transformer of claim 1, wherein the at the at least one mechanism is configured to cause a high resistance ground fault between the secondary winding and ground.

9. The training transformer of claim 1, wherein the at least one mechanism comprises a selector switch.

10. The training transformer of claim 9, wherein the selector switch is positioned on the housing.

11. The training transformer of claim 1, wherein the at least one mechanism comprises a first selector switch and a second selector switch.

12. The training transformer of claim 11, wherein the first selector switch and the second selector switch are positioned on the housing.

13. The training transformer of claim 11, wherein the first selector switch and the second selector switch each comprise four positions.

14. The training transformer of claim 13, wherein, for the first selector switch:
   a first position corresponds to a normal operating condition;
   a second position corresponds to a primary open condition;
   a third position corresponds to a primary short or ground fault condition; and a fourth position corresponds to a primary and secondary short condition.

15. The training transformer of claim 13, wherein, for the second selector switch:

a first position corresponds to a normal operating condition;

a second position corresponds to a secondary open condition;

a third position corresponds to a secondary short or ground fault condition; and a fourth position corresponds to a high resistance ground fault condition.

16. The training transformer of claim 13, wherein:

for the first selector switch:

a first position corresponds to a normal operating condition;

a second position corresponds to a primary open condition;

a third position corresponds to a primary short or ground fault condition; and a fourth position corresponds to a primary and secondary short condition; and, for the second selector switch:

a first position corresponds to a normal operating condition;

a second position corresponds to a secondary open condition;

a third position corresponds to a secondary short or ground fault condition; and a fourth position corresponds to a high resistance ground fault condition.

\* \* \* \* \*